United States Patent
Sohail et al.

(10) Patent No.: US 11,941,155 B2
(45) Date of Patent: Mar. 26, 2024

(54) SECURE DATA MANAGEMENT IN A NETWORK COMPUTING ENVIRONMENT

(71) Applicant: EMC IP Holding Company LLC, Hopkinton, MA (US)

(72) Inventors: Mohamed Sohail, Sheikh Zayed (EG); Said Tabet, Austin, TX (US)

(73) Assignee: EMC IP Holding Company LLC, Hopkinton, MA (US)

( * ) Notice: Subject to any disclaimer, the term of this patent is extended or adjusted under 35 U.S.C. 154(b) by 87 days.

(21) Appl. No.: 17/201,117

(22) Filed: Mar. 15, 2021

(65) Prior Publication Data
US 2022/0292221 A1    Sep. 15, 2022

(51) Int. Cl.
*H04L 29/00* (2006.01)
*G06F 21/60* (2013.01)
*G06F 21/62* (2013.01)
*H04L 9/40* (2022.01)

(52) U.S. Cl.
CPC ........ *G06F 21/6263* (2013.01); *G06F 21/602* (2013.01); *H04L 63/105* (2013.01); *H04L 63/20* (2013.01)

(58) Field of Classification Search
CPC . G06F 21/6263; G06F 21/602; H04L 63/105; H04L 63/20
USPC ......................................................... 726/26
See application file for complete search history.

(56) References Cited

U.S. PATENT DOCUMENTS

| | | |
|---|---|---|
| 7,149,771 B1 | 12/2006 | Gifford |
| 7,343,601 B2 | 3/2008 | Azagury et al. |
| 7,752,437 B1 | 7/2010 | Thakur et al. |
| 7,877,621 B2 | 1/2011 | Jacoby et al. |
| 8,010,426 B2 | 8/2011 | Kopp et al. |
| 8,316,237 B1 | 11/2012 | Felsher et al. |

(Continued)

FOREIGN PATENT DOCUMENTS

WO    2012061663 A2    5/2012

OTHER PUBLICATIONS

AT&T, "The Cloud Comes to You: AT&T to Power Self-Driving Cars, AR/VR and Other Future 5G Applications Through Edge Computing," https://about.att.com/story/reinventing_the_cloud_through_edge_computing.html#sthash.fuJidM8M.uxfs, Jul. 18, 2017, 7 pages.

(Continued)

*Primary Examiner* — Brandon Hoffman
*Assistant Examiner* — Michael D Anderson
(74) *Attorney, Agent, or Firm* — Ryan, Mason & Lewis, LLP

(57) ABSTRACT

Techniques are provided for secure data management in a network computing environment. A security management system receives data from a device which operates in a device network that is managed by the security management system. The security management system performs a data classification process to determine a data sensitivity level of the received data. The security management system determines a type of encryption to apply to the received data based on the determined data sensitivity level. The type of encryption is determined from a plurality of different types of encryption that are supported by a cloud system. The security management system sends the received data to the cloud system to at least one of store the data and perform secured data analytic processing of the data, in a format according to the determined type of encryption.

20 Claims, 7 Drawing Sheets

(56) References Cited

U.S. PATENT DOCUMENTS

| | | |
|---|---|---|
| 8,543,247 B2 | 9/2013 | Boss et al. |
| 8,671,449 B1 | 3/2014 | Nachenberg |
| 8,706,692 B1 | 4/2014 | Luthra et al. |
| 8,756,656 B1 | 6/2014 | Hartmann |
| 8,769,355 B2 | 7/2014 | Scott et al. |
| 8,779,921 B1 | 7/2014 | Curtiss |
| 8,850,145 B1 | 9/2014 | Haase et al. |
| 8,893,293 B1 | 11/2014 | Schmoyer et al. |
| 8,904,299 B1 | 12/2014 | Owen et al. |
| 8,972,564 B1 | 3/2015 | Allen |
| 9,020,802 B1 | 4/2015 | Florissi et al. |
| 9,031,992 B1 | 5/2015 | Florissi et al. |
| 9,154,948 B2 | 10/2015 | Khare et al. |
| 9,158,843 B1 | 10/2015 | Florissi et al. |
| 9,256,656 B2 | 2/2016 | Fankhauser et al. |
| 9,268,938 B1 | 2/2016 | Aguayo Gonzalez et al. |
| 9,293,194 B2 | 3/2016 | Gurgi et al. |
| 9,361,175 B1 | 6/2016 | Bose et al. |
| 9,503,422 B2 | 11/2016 | Al-Khowaiter et al. |
| 9,509,707 B2 | 11/2016 | Patne et al. |
| 9,594,546 B1 | 3/2017 | Todd et al. |
| 9,727,591 B1 | 8/2017 | Sharma et al. |
| 9,785,360 B1 | 10/2017 | Ravindranath et al. |
| 9,805,213 B1 | 10/2017 | Kragh |
| 9,860,257 B1 | 1/2018 | Kumar et al. |
| 9,882,985 B1 | 1/2018 | Esam et al. |
| 10,057,264 B1 | 8/2018 | ElNakib et al. |
| 10,069,914 B1 | 9/2018 | Smith |
| 10,097,572 B1 | 10/2018 | Sohail et al. |
| 10,126,980 B2 | 11/2018 | Laden et al. |
| 10,296,501 B1 | 5/2019 | Todd et al. |
| 10,325,115 B1 | 6/2019 | Zeldin et al. |
| 10,394,793 B1 | 8/2019 | Todd et al. |
| 10,419,931 B1 | 9/2019 | Sohail et al. |
| 10,425,477 B2 | 9/2019 | Trandafir |
| 2003/0055898 A1 | 3/2003 | Yeager et al. |
| 2003/0217119 A1 | 11/2003 | Raman et al. |
| 2004/0010699 A1 | 1/2004 | Shao et al. |
| 2004/0162885 A1 | 8/2004 | Garg et al. |
| 2004/0243692 A1 | 12/2004 | Arnold et al. |
| 2005/0033980 A1 | 2/2005 | Willman et al. |
| 2005/0071508 A1 | 3/2005 | Brown et al. |
| 2005/0076198 A1 | 4/2005 | Skomra et al. |
| 2005/0108703 A1 | 5/2005 | Hellier |
| 2005/0120134 A1 | 6/2005 | Hubis |
| 2005/0228916 A1 | 10/2005 | Telesco |
| 2006/0020784 A1 | 1/2006 | Jonker et al. |
| 2006/0026683 A1 | 2/2006 | Lim |
| 2006/0155738 A1 | 7/2006 | Baldwin et al. |
| 2006/0161444 A1 | 7/2006 | Lubrecht et al. |
| 2007/0113225 A1 | 5/2007 | Felts |
| 2008/0083031 A1 | 4/2008 | Meijer et al. |
| 2008/0091747 A1 | 4/2008 | Prahlad et al. |
| 2008/0091975 A1 | 4/2008 | Kladko et al. |
| 2008/0104060 A1 | 5/2008 | Abhyankar et al. |
| 2008/0107037 A1 | 5/2008 | Forbes et al. |
| 2008/0134332 A1 | 6/2008 | Keohane et al. |
| 2008/0270524 A1 | 10/2008 | Gupta et al. |
| 2009/0016534 A1 | 1/2009 | Ortiz Cornet et al. |
| 2009/0138632 A1 | 5/2009 | Miura et al. |
| 2009/0182945 A1 | 7/2009 | Aviles et al. |
| 2009/0193147 A1 | 7/2009 | Lepeska |
| 2010/0036952 A1 | 2/2010 | Hazlewood et al. |
| 2010/0058054 A1 | 3/2010 | Irvine |
| 2010/0076987 A1 | 3/2010 | Schreiner |
| 2010/0106558 A1 | 4/2010 | Li et al. |
| 2010/0250867 A1 | 9/2010 | Bettger et al. |
| 2010/0332530 A1 | 12/2010 | McKelvie et al. |
| 2011/0047056 A1 | 2/2011 | Overman et al. |
| 2011/0126197 A1 | 5/2011 | Larsen et al. |
| 2011/0153727 A1 | 6/2011 | Li |
| 2011/0179110 A1 | 7/2011 | Soloway |
| 2011/0191562 A1 | 8/2011 | Chou et al. |
| 2011/0225276 A1 | 9/2011 | Hamilton, II et al. |
| 2011/0231899 A1 | 9/2011 | Puller et al. |
| 2011/0246653 A1 | 10/2011 | Balasubramanian et al. |
| 2011/0276758 A1 | 11/2011 | Garmiza et al. |
| 2012/0066487 A1 | 3/2012 | Brown et al. |
| 2012/0089514 A1 | 4/2012 | Kraemling et al. |
| 2012/0159099 A1 | 6/2012 | Lindamood et al. |
| 2012/0254115 A1 | 10/2012 | Varadharajan |
| 2012/0284713 A1 | 11/2012 | Ostermeyer et al. |
| 2013/0151795 A1 | 6/2013 | Lee |
| 2013/0159550 A1 | 6/2013 | Vasseur |
| 2013/0304652 A1 | 11/2013 | Onda et al. |
| 2013/0305376 A1 | 11/2013 | Chauhan et al. |
| 2013/0311674 A1 | 11/2013 | Garcia-Luna-Aceves et al. |
| 2014/0019423 A1 | 1/2014 | Liensberger et al. |
| 2014/0020075 A1 | 1/2014 | Bhagavatula et al. |
| 2014/0215207 A1 | 7/2014 | Datta et al. |
| 2014/0230055 A1 | 8/2014 | Boehl |
| 2014/0244836 A1 | 8/2014 | Goel et al. |
| 2014/0277801 A1 | 9/2014 | Cioraca et al. |
| 2014/0286354 A1 | 9/2014 | Van De Poel et al. |
| 2015/0039882 A1 | 2/2015 | Watanabe |
| 2015/0127660 A1 | 5/2015 | Zilberberg et al. |
| 2015/0180894 A1 | 6/2015 | Sadovsky et al. |
| 2015/0195296 A1 | 7/2015 | Vasseur et al. |
| 2015/0220649 A1 | 8/2015 | Papa et al. |
| 2015/0229654 A1 | 8/2015 | Perier |
| 2015/0286697 A1 | 10/2015 | Byrne et al. |
| 2015/0310195 A1 | 10/2015 | Bailor et al. |
| 2015/0317475 A1 | 11/2015 | Aguayo Gonzalez et al. |
| 2015/0341466 A1 | 11/2015 | Sah et al. |
| 2015/0347264 A1 | 12/2015 | Mohammed et al. |
| 2015/0365473 A1 | 12/2015 | Zuerner |
| 2015/0373049 A1 | 12/2015 | Sharma et al. |
| 2015/0378788 A1 | 12/2015 | Roese et al. |
| 2016/0012239 A1 | 1/2016 | Brucker et al. |
| 2016/0014158 A1 | 1/2016 | Schrecker et al. |
| 2016/0037436 A1 | 2/2016 | Spencer et al. |
| 2016/0050279 A1 | 2/2016 | Pahng |
| 2016/0078230 A1 | 3/2016 | Silverstone |
| 2016/0080406 A1 | 3/2016 | Sadovsky et al. |
| 2016/0112374 A1 | 4/2016 | Branca |
| 2016/0173511 A1 | 6/2016 | Bratspiess et al. |
| 2016/0212099 A1 | 7/2016 | Zou et al. |
| 2016/0226732 A1 | 8/2016 | Kim et al. |
| 2016/0261465 A1 | 9/2016 | Gupta et al. |
| 2016/0267082 A1 | 9/2016 | Wong et al. |
| 2016/0337127 A1 | 11/2016 | Schultz et al. |
| 2016/0371396 A1 | 12/2016 | Todd et al. |
| 2016/0380913 A1 | 12/2016 | Morgan et al. |
| 2017/0005808 A1 | 1/2017 | Gunti et al. |
| 2017/0013058 A1 | 1/2017 | Annamalai et al. |
| 2017/0054802 A1 | 2/2017 | Annamalai et al. |
| 2017/0093907 A1 | 3/2017 | Srivastava |
| 2017/0096123 A1 | 4/2017 | Gennermann et al. |
| 2017/0134173 A1 | 5/2017 | Kern et al. |
| 2017/0180380 A1 | 6/2017 | Bagasra |
| 2017/0206148 A1 | 7/2017 | Mehta et al. |
| 2017/0310482 A1 | 10/2017 | Reed et al. |
| 2017/0344047 A1 | 11/2017 | Cioraca et al. |
| 2018/0004937 A1* | 1/2018 | Shannon ............... H04L 9/088 |
| 2018/0054490 A1 | 2/2018 | Wadhwa et al. |
| 2018/0167812 A1 | 6/2018 | Nagarajamoorthy et al. |
| 2018/0275642 A1 | 9/2018 | Tajima et al. |
| 2018/0278685 A1 | 9/2018 | Tiwari et al. |
| 2018/0314750 A1 | 11/2018 | Merriman et al. |
| 2018/0337785 A1 | 11/2018 | Sanciangco et al. |
| 2019/0335333 A1 | 10/2019 | Sohail et al. |
| 2020/0145480 A1 | 5/2020 | Sohail et al. |
| 2020/0210313 A1* | 7/2020 | Degaonkar .......... G06F 11/3055 |
| 2020/0344299 A1 | 10/2020 | Sohail et al. |
| 2021/0258151 A1* | 8/2021 | Cristina .............. G06F 21/602 |

OTHER PUBLICATIONS

B. Bellile, "Verizon's 'cloud-in-a-box' pushes the edge with OpenStack," https://siliconangle.com/2017/07/17/verizons-cloud-box-pushes-edges-openstack-openstacksummit/, Jul. 17, 2017, 7 pages.

Y. Li et al., "MobiQoR: Pushing the Envelope of Mobile Edge Computing via Quality-of-Result Optimization," in 2017 IEEE 37th

(56) References Cited

OTHER PUBLICATIONS

International Conference on Distributed Computing Systems, Jun. 2017, 10 pages.
Cisco, "Cisco Visual Networking Index: Forecast and Methodology, 2016-2021," White paper, Jun. 6, 2017, 17 pages.
IEEE Technology Blog, "IDC Directions 2017: IoT Forecast, 5G & Related Sessions," https://techblog.comsoc.org/2017/03/04/idc-directions-2017-iot-forecast-related-sessions/, Mar. 4, 2017, 9 pages.
A. Lane, "Understanding and Selecting Data Masking Solutions: Creating Secure and Useful Data," https://securosis.com/assets/library/reports/UnderstandingMasking_FinalMaster_V3.pdf, Aug. 10, 2012, 33 pages.
J. Kepner et al., "Computing on Masked Data: a High Performance Method for Improving Big Data Veracity," IEEE High Performance Extreme Computing Conference, Sep. 2014, 6 pages.
R. A. Popa et al., "CryptDB: Protecting Confidentiality with Encrypted Query Processing," Proceedings of the 23rd ACM Symposium on Operating Systems Principles, Oct. 2011, 16 pages.
A. Papadimitriou et al., "Big Data Analytics over Encrypted Datasets with Seabed," Proceedings of the 12th USENIX Symposium on Operating Systems Design and Implementation, Nov. 2016, 16 pages.
Cloud Security Alliance, "Top Ten Big Data Security and Privacy Challenges," Nov. 2012, 11 pages.
Link-labs.com, "An In-Depth Look at IoT in Agriculture & Smart Farming Solutions," https://www.link-labs.com/blog/iot-agriculture, Nov. 30, 2017, 4 pages.
Dell EMC, "Dell EMC Recoverpoint: Continuous Data Protection for Any Point in Time Recovery," http://www.emc.com.storage/recoverpoint/recoverpoint.htm, Data Sheet, Sep. 2016, 4 pages.
R. Goyal et al., "Analysis and Simulation of Delay and Buffer Requirements of Satellite-ATM Networks for TCP/IP Traffic," IEEE Journal of Selected Areas in Communications, Sep. 30, 1998, 24 pages.
H. Bai et al., "Wireless Sensor Network for Aircraft Health Monitoring," China Communications, Feb. 2005, pp. 70-77.
Capgemini Consulting, "Securing the Internet of Things Opportunity: Putting Cybersecurity at the Heart of the IoT," Sogeti High Tech, Feb. 12, 2015, 17 pages.
S. Ong, "NFC Technology for Smart Wearables in the Payment and Transport Market," IOT Asia, Mar. 30, 2016, 27 pages.
A. Patrizio, "IoT Security Issues: How to Secure the Network," http://www.datamation.com/security/iot-security-issues-how-to-secure-the-network.html, Jun. 7, 2016, 2 pages.
K. Richards, "Big Data Analytics: New Patterns Emerge for Security," http://searchsecurity.techtarget.com/feature/Big-data-analytics-New-patterns-emerge-for-security, Jun. 2013, 7 pages.
GSM Association, "Understanding the Internet of Things (IoT)," Connected Living, Jul. 2014, 15 pages.
Gartner, "Gartner's 2014 Hype Cycle for Emerging Technologies Maps the Journey to Digital Business," http://www.gartner.com/newsroom/id/2819918, Aug. 11, 2014, 5 pages.
L. Price, "Big Data and Actionable Analytics: Is it All Hype?" https://securityintelligence.com/big-data-and-actionable-analytics-is-it-all-hype/, Jun. 12, 2013, 4 pages.
IDC, "Market in a Minute: Internet of Things," http://www.idc.com/downloads/idc_market_in_a_minute_iot_infographic.pdf, 2014-2020, 1 page.
IEEE Standards Association, "P2413—Standard for an Architectural Framework for the Internet of Things (IoT)," https://standards.ieee.org/develop/project/2413.html, May 4, 2016, 1 page.
Cisco.com, "Internet of Things (IoT)," http://www.cisco.com/c/en/us/solutions/internet-of-things/iot-products.html, May 4, 2016, 2 pages.
ISO/IEC JTC 1, "Internet of Things (IoT)," Preliminary Report, 2014, 17 pages.
ABI Research, "More Than 30 Billion Devices Will Wirelessly Connect to the Internet of Everything in 2020," https://www.abiresearch.com/press/more-than-30-billion-devices-will-wirelessly-conne/, May 9, 2013, 1 page.
Mfrontiers LLC, "mFinity IoT," http://www.mfrontiers.com/mfinity-iot-overview/, May 18, 2016, 2 pages.
Gartner, "IT Glossary," http://www.gartner.com/it-glossary/, May 4, 2016, 3 pages.
V. K. Vavilapalli et al., "Apache Hadoop YARN: Yet Another Resource Negotiator," Proceedings of the 4th Annual Symposium on Cloud Computing (SOCC), Article No. 5, Oct. 2013, 16 pages.
International Telecommunication Union, "Series Y: Global Information Infrastructure, Internet Protocol Aspects and Next-Generation Networks: Next Generation Networks—Frameworks and Functional Architecture Models," Recommendation ITU-T Y.2060, Jun. 2012, 22 pages.
The Security Ledger, "Pentagon Looks to Analog Monitoring to Secure IoT," Oct. 1, 2015, 7 pages.
Virta Laboratories Inc., "Virta Labs Introduces PowerGuard," http://www.eecs.umich.edu/eecs/about/articles/2015/VirtaLabs.html, Aug. 12, 2015, 2 pages.
A. Paul et al., "Centralized Security System Based on IoT," International Journal of Research in Advance Engineering, vol. 2, Issue 3, May-Jun. 2016, pp. 15-20.
O. Arias et al., "Privacy and Security in Internet of Things and Wearable Devices," IEEE Transactions on Multi-Scale Computing Systems, vol. 1, No. 2, Apr.-Jun. 2015, pp. 99-109.
N. Khalil et al., "Wireless Sensor Network for Internet of Things," arXiv:1606.08407v1, Jun. 27, 2016, 6 pages.
P. Banerjee et al., "The Future of Cloud Computing: An HP Labs Perspective," HP Labs Technical Reports, Dec. 2010, 12 pages.
C. Dai et al., "An Approach to Evaluate Data Trustworthiness Based on Data Provenance," Proceedings of the 5th VLDB Workshop on Secure Data Management (SDM '08), Aug. 2008, pp. 82-98.
P. De Leusse et al., "Toward Governance of Cross-Cloud Application Deployment," Second Optimising Cloud Services Workshop, Mar. 2012, 12 pages.
A. Gehani et al., "Mendel: Efficiently Verifying the Lineage of Data Modified in Multiple Trust Domains," Proceedings of the 19th ACM International Symposium on High Performance Distributed Computing (HPDC '10), Jun. 2010, 13 pages.
M. T. Jones, "Anatomy of a Cloud Storage Infrastructure," http://www.ibm.com/developerworks/cloud/library/cl-cloudstorage, Nov. 2010, 7 pages.
P. Mell et al., "The NIST Definition of Cloud Computing," U.S. Department of Commerce, Computer Security Division, National Institute of Standards and Technology, Special Publication 800-145, Sep. 2011, 7 pages.
S. Pearson, "Privacy, Security and Trust in Cloud Computing," HP Labs Technical Reports, Jun. 2012, 58 pages.
EMC, "EMC Centera Content—Addressable Storage—Archiving Made Simple, Affordable and Secure," http://www.emc.com/collateral/hardware/data-sheet/c931-emc-centera-cas-ds.pdf, May 2013, 4 pages.
Broadband Properties, "Cloud Computing and Sustainability," Green Networking, Jan./Feb. 2011, pp. 74-79.
L. Watkins et al., "A Passive Approach to Rogue Access Point Detection," Global Telecommunications Conference, IEEE Globecom, Nov. 26-30, 2007, pp. 355-360.
Intel, "Quad-Core Intel Xeon Processor 3200 Series," http://www.intel.ie/content/dam/www/public/us/en/documents/specification-updates/xeon-3200specification-update.pdf, Dec. 2010, Document No. 316134-016, 70 pages.
Dell EMC "CloudBoost Release Notes," Version 19.2, Nov. 15, 2019, 5 pages.
Equinix, Inc. "Realising the Opportunities of Data at the Edge," http://www.csiltd.co.uk/wp-content/uploads/2020/06/CSI-Equinix-Infographic.pdf, Jun. 2020, 1 page.

\* cited by examiner

SECURE DATA MANAGEMENT IN A NETWORK COMPUTING ENVIRONMENT

FIELD

This disclosure relates generally to data management techniques, in particular, to data management techniques in network computing environments.

BACKGROUND

Currently, cloud computing services are provided globally to millions of users and customers who reside in different geolocations (e.g., countries, continents, etc.). Various entities provide private or public cloud computing services globally to different customers over various sectors for critical and non-critical applications. These entities provide various cloud computing services including, for example, software-as-a-service (SaaS), infrastructure-as-a-service (IaaS), and/or platform-as-a-service (PaaS). Such cloud computing services are particularly useful for implementing Internet of Things eco-systems. The Internet of Things (IoT) is a term that refers to a network computing environment in which physical things such as devices, objects, and other things, etc., are equipped with unique identifiers, network connectivity, and other embedded technologies, which allows such devices, objects, and things to sense, communicate, interact, and send/receive data over one or more communications networks (e.g., Internet, etc.) without requiring human-to-human or human-to-computer interaction. For an IoT application, a "thing" may include any object that can be assigned an IP address and have the capability to transfer data over a communications network.

Cloud computing and IoT technology are considered to be key enablers for many emerging and future "smart" applications and, consequently, there is expected to be an exponential increase in the number of network-connected devices, objects, and autonomous things, which are connected over a communications network such as the Internet and, consequently, an exponential increase in the amount of data that must be managed and processed in a secure manner. Moreover, the continued growth of internet-connected devices (e.g., IoT) along with new applications that require real-time computing power, are driving factors for edge computing systems which are implemented to provide intelligent processing, enhanced computing power, and advanced services at the IoT network edge. The rapid growth and ubiquity of cloud computing, IoT, and edge computing systems comes with challenges and risks associated with data management and security.

SUMMARY

Exemplary embodiments of the disclosure include methods for providing secure data management in a network computing environment. For example, in one exemplary embodiment, a security management system receives data from a device which operates in a device network that is managed by the security management system. The security management system performs a data classification process to determine a data sensitivity level of the received data. The security management system determines a type of encryption to apply to the received data based on the determined data sensitivity level. The type of encryption is determined from a plurality of different types of encryption that are supported by a cloud system. The security management system sends the received data to the cloud system to at least one of (i) store the data and (ii) perform secured data analytic processing of the data, in a format according to the determined type of encryption.

Other embodiments of the disclosure include, without limitation, systems and articles of manufacture comprising processor-readable storage media, which are configured to provide secure data management in a network computing environment.

DETAILED DESCRIPTION

Figure 1:
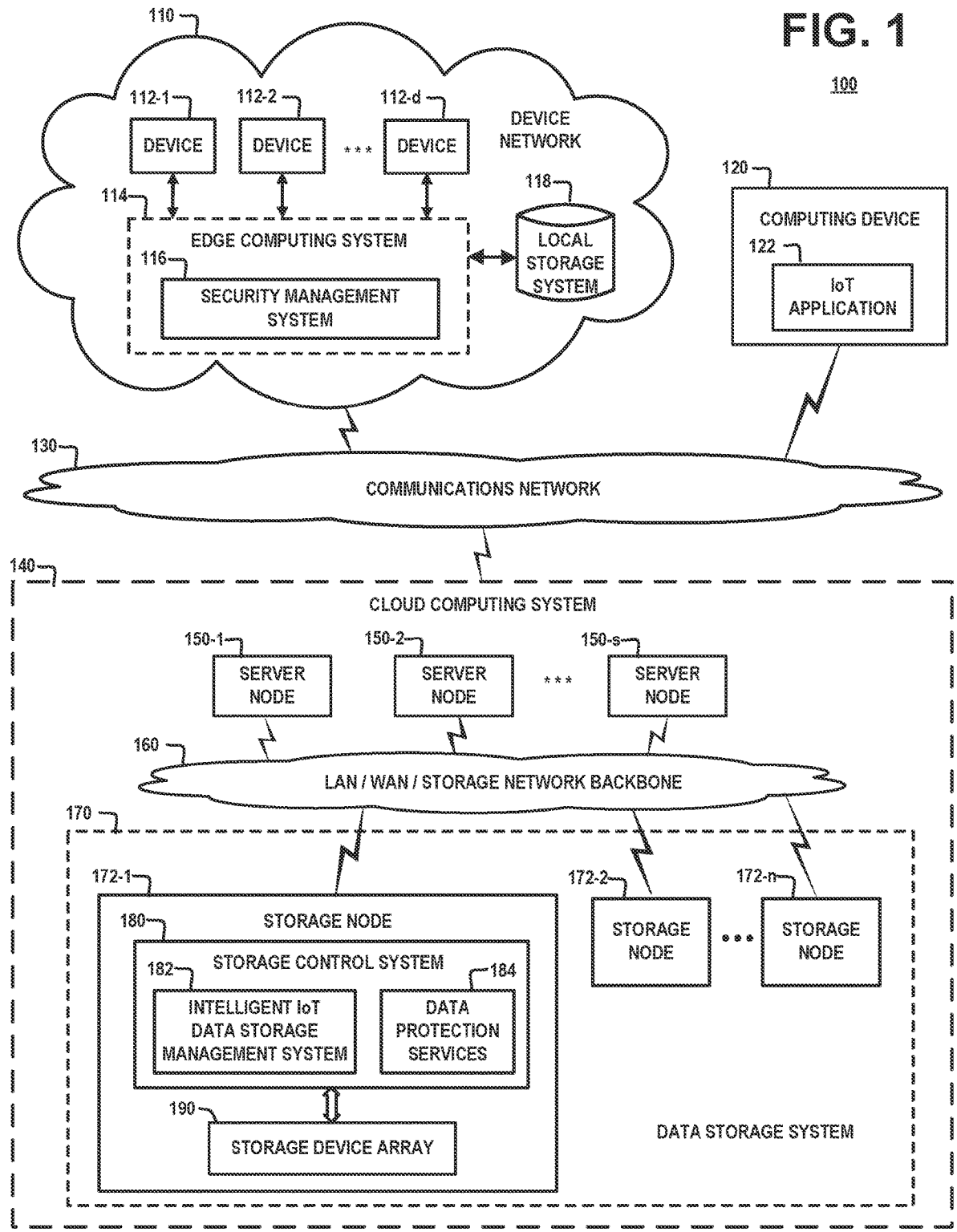
FIG. 1 schematically illustrates a system to provide secure data management in a network computing environment, according to an exemplary embodiment of the disclosure.

Exemplary embodiments will now be described in further detail with regard to systems and methods to provide secure data management in a network computing environment. For purposes of illustration, exemplary embodiments will be described herein with reference to exemplary network computing environments which implement data processing systems and associated computers, servers, storage devices and other processing devices. It is to be appreciated, however, that these and other embodiments are not restricted to the particular illustrative system and device configurations shown. Accordingly, the term "network computing environment" as used herein is intended to be broadly construed, so as to encompass, for example, processing systems comprising any combination of device networks (e.g., IoT network), edge computing systems (e.g., IoT edge computing systems), and cloud computing and storage systems, as well as other types of processing systems comprising various combinations of physical and virtual processing resources. A network computing environment may therefore comprise, for example, one or more data centers or other cloud-based systems that include one or more clouds hosting multiple tenants that share cloud resources. Numerous different types of enterprise computing and storage systems are also encompassed by the term "network computing environment" as that term is broadly used herein.

In general, exemplary embodiments of the disclosure provide techniques to implement secure data management in an edge computing system of an IoT network computing environment. The secure data management techniques as disclosed herein serve to reposition the veracity and data analytics handling of IoT data in an edge computing system based on IoT data sensitivity classification in the context of IoT security tiering (secure data storage and/or secure data analytics). Such techniques are implemented in view of distinct patterns that are commonly exhibited by IoT and edge use-cases as well as some cloud-based applications.

For example, in an instance where a cloud computing system supports one or more IoT application domains, the cloud computing system can acquire and process large amounts of data received from billions of IoT devices at various geolocations, and be configured to enable cross-domain interaction and platform unification through increased system compatibility, interoperability and functional exchangeability. In this regard, the amount of IoT data that the cloud computing system acquires for processing can exponentially grow over time. Indeed, IoT applications are data intensive and typically generate continuous streaming datasets, wherein massive amounts of data are continuously generated from large numbers of sensors and devices. For example, a smart field can be implemented using an array of sensors (e.g., humidity sensors, temperature sensors, etc.), wherein a sensor is located every 1-10 meters in a given array (e.g., a 10 square kilometer array), Assuming 1 KB of data (e.g., humidity data, temperature data, etc.) is generated by each sensor per minute, the sensor array would generate more than one terabyte (TB) of data per day, which results in a massive amount of data being ingested by the cloud computing system. Another IoT example is a video analytics and surveillance system which could generate even more data. In this regard, the manner in which the IoT data is stored and analyzed should be considered to reduce or minimize the financial costs and/or computing costs associated with IoT data storage and IoT data analytics in the cloud computing system.

Furthermore, the data which is generated for IoT applications and other cloud-based applications is globally accessed by many users/applications over various geolocations. Indeed, once the massive amount of IoT data is ingested into a cloud computing system, the data is typically accessed globally by different requesting entities (e.g., users or applications) from different locations (e.g., across different sites, cities or countries) for different purposes.

Moreover, IoT applications have distinct data access operations. In particular, IoT data is generated by edge sensors and/or edge devices, and such machine-generated data is ingested to the cloud computing system. Once the machine-generated data is ingested, the data can be distributed or replicated to one or more data centers or sites, and globally accessed in read mode by many users and/or applications for purposes of analyzing the data in read mode (e.g., analyzing IoT data is a valuable aspect of IoT computing).

In this regard, many IoT applications are "read intensive" wherein the stored IoT data is frequently accessed and utilized by many users. This use pattern also aligns with many cloud-based applications including, for example, big data analytics, web applications, news media, photo sharing, etc., wherein data replication and global sharing are important backbone building blocks for such applications. With read intensive applications, when the data is stored in encrypted form (as opposed to plaintext form) and frequently accessed by many applications/user, the data read access operations can require a considerable amount of computing power (for secured data analytics, decrypting the data for reading by authorized users, etc.), which will result in increased financial costs for having such data analyzed or made available for reading.

In view of these use patterns, exemplary embodiments of the disclosure provide secure data management systems that are configured to implement IoT data classification and security tiering methods to minimize the financial costs and computing costs associated with (i) storing and managing massive amounts of encrypted/masked IoT data for, e.g., read intensive IoT applications, and (ii) performing secured data analytics (e.g., computing on encrypted data), etc. As explained in further detail below, exemplary embodiments of the disclosure implement methods for managing IoT data in a federated way to reduce the cost of data analytics, and to achieve an optimized performance based on fine-grain security classifications of IoT data.

For example, methods are implemented to classify IoT data based on sensitivity levels of the IoT data. The sensitivity levels are classified based on, e.g., customized security policies which are used to classify the data sensitivity levels of various data flows generated from the underlying IoT systems (smart homes, manufacturers, aviation, connected cars, etc.). The data sensitivity classification enables better leverage of various services provided by cloud systems with regard to, e.g., data encryption or masking, secure data analytics, tiered storage, etc. The exemplary data management techniques as disclosed herein for classifying IoT data sensitivity and security tiering provide an efficient and economical approach for storing and processing IoT data in a cloud system, by ensuring that when IoT data is needed to be read or analyzed, the users do not have to pay for extra computing power unnecessarily (e.g., reduce the computing cost associated with analytics on masked/encrypted data) for IoT data that is encrypted at a given level that may be greater than what is actually needed to adequately protect the IoT data with an acceptable leakage level.

FIG. 1 schematically illustrates a system 100 which provides secure data management in a network computing environment, according to an exemplary embodiment of the disclosure. The system 100 comprises a device network 110, at least one computing device 120, a communications network 130, and a cloud computing system 140. The device network comprises a plurality of IoT devices 112-1, . . . , 112-d (collectively referred to as IoT devices 112), an edge computing system 114 comprising a security management system 116, and a local data storage system 118. The computing device 120 executes a client-side IoT application 122. The cloud computing system 140 comprises a plurality of server nodes 150-1, 150-2, . . . , 150-s (collectively referred to as server nodes 150), a computing system network 160, a data storage system 170 comprising a cluster of storage nodes 172-1, 172-2, . . . , 172-n (collectively, storage nodes 172). The storage node 172-1 comprises a storage control system 180, and storage device array 190 comprising a plurality of storage devices. The storage control system 180 hosts an intelligent IoT data storage management system 182, and provides various data protection services 184. In some embodiments, the other storage nodes 172-2 . . . 172-n have the same or similar configuration as the storage node 172-1 shown in FIG. 1

The IoT devices 112 that operate within the device network 110 may comprise various types of devices, objects and things such as mobile computing devices, smart phones, radio frequency identification (RFID) devices, smart sensors, smart appliances, wireless sensors, computers, security cameras, and other types of smart devices, objects and things that are configured to support IoT applications for one or more application domains. The IoT devices 112 generate data which is processed by the edge computing system 114, and stored locally and/or uploaded to the cloud computing system 140 over the communications network 130 for data analytics processing, data storage, data management, etc. by the cloud computing system 140.

In some embodiments, the IoT devices 112 of the device network 110 comprise a network of IoT sensor devices which are configured to collect raw sensor data and transmit the collected sensor data to the edge computing system 114 and/or the cloud computing system 140 for storage and analytic processing. The device network 110 may comprise sensor devices that are utilized for, e.g., environmental monitoring (e.g., temperature, pressure, humidity, sound, etc.), process management monitoring, healthcare monitoring, industrial monitoring, traffic monitoring, etc. By way of example, for agriculture applications, sensor devices can be utilized for monitoring harvesting operations, crop growth, and detection of crop disease. In this regard, the IoT devices 112 can collect agricultural information in the form of text data or images of the crop field. For weather applications, a sensor network can be utilized to monitor weather conditions in a given area.

Furthermore, for the healthcare domain, the IoT devices 112 can be utilized for remote health monitoring and emergency notification. Health monitoring devices include blood pressure and heart rate sensors, blood oxygen content sensors, pacemakers, hearing aids, etc. Insurance companies can utilize IoT data to automatically track and reconcile insurance claims and ensure proper payments are made to claimants. Furthermore, for the home and building domain, the IoT devices 112 can be implemented to monitor and control mechanical, electrical and electronic systems that are utilized in residential, commercial or industrial buildings. For example, home and building automation systems can implement IoT devices/sensors to automatically control lighting, heating, ventilation, air conditioning, appliances, communication systems, entertainment and home security devices, etc.

Moreover, for the energy domain, the IoT devices 112 can include sensors and actuators that are implemented, for example, in energy consuming devices (e.g., switches, power outlets, light bulbs, etc.) and can be equipped to communicate with power supply companies to provide IoT data that enables the power supply companies to effectively balance power generation and energy usage through "smart grids." For example, IoT devices would enable power supply companies to acquire and process IoT data with regard to energy usage in various regions and automatically control and manage production and distribution of electricity in such regions, e.g., control and manage distribution devices such as transformers. In addition, for the manufacturing domain, IoT devices can be used for network control and management of manufacturing equipment or manufacturing process control. Moreover, for a security application, the IoT devices can include a plurality of IoT-enabled camera systems within a given facility to identify individuals in the facility, wherein the IoT-enabled camera systems capture image data that is processed by, e.g., the cloud computing system 140, to provide real-time monitoring and alerting if certain people are identified.

The edge computing system 114 provides a distributed computing topology in which the edge computing system 114 IoT is configured to perform data processing, storage, and management operations close to the edge of the device network 110 where the IoT devices 112 generate and/or consume data. For example, in some embodiments, the edge computing system 114 is configured to analyze IoT data generated by the IoT devices 112 to perform certain actions, before the IoT data is sent to the cloud computing system 140 for storage and/or further processing. The local processing of the IoT data by the edge computing system 114 provides support for real-time systems and alerts, and allows for managing the data which is sent to the cloud computing system 140. The edge computing system 114 solves a fundamental problem associated with the centralized processing of IoT data in the cloud computing system 140. While the cloud computing system 140 provides high-performance storage and data processing, the remote processing can create delays for IoT devices 112 sending data back and forth. By bringing cloud computing capabilities to local devices, IoT edge computing can process data faster, preventing delays, security breaches and other concerns.

In some embodiments, the edge computing system 114 hosts and executes applications that are configured to perform local data processing and data management operations including, but not limited to, event processing, machine learning and artificial intelligence processing, data storage management, etc. For example, the edge computing system 114 can implement event processing software and services to process IoT data from IoT devices 112 (e.g., IoT sensor devices) and identify specific patterns in the data which require certain actions to be taken. The data can be analyzed against models that are generated by the cloud computing system 140 and pushed to the edge computing system 114. The edge computing system 114 can host machine learning and artificial intelligence applications for various applications using machine learning models that are generated locally, or generated by the cloud computing system 140 and pushed to the edge computing system 114. The edge computing system 114 can run applications that (e.g., containerized applications) that allow various applications and services to be provided to the IoT devices 112 in the device network 110 for a given IoT application domain. Further, the edge computing system 114 implements data management applications and services to control the data that is collected, aggregated and transmitted to cloud computing system 140.

The security management system 116 is configured to perform various security-related operations within device network 110. For example, the security management system 116 is configured to manage secured enrollment of IoT devices 112 within the device network 110. In addition, the security management system 116 implements security policies to manage the veracity and analytics of IoT data handling based on a sensitivity level of the IoT data. In particular, as explained in further detail below, the security management system 116 performs data classification operations to classify IoT data according to a sensitivity level of the IoT data, and utilizes the classified sensitivity level of IoT data to determine minimum security requirements (e.g., type of encryption, etc.) for protecting the IoT data. In addition, the security management system 116 performs "security tiering" management operations that are configured to determine a proper security tier of IoT data residing in the cloud computing system 140 for purposes of data storage and secure analytics on masked data and/encrypted data (e.g., computing on encrypted data, computing on masked data, etc.).

The local data storage system 118 is configured for on-premises storage of IoT data in a secured manner. In this regard, the security management system 116 implements one or more different types of data encryption and/or data masking techniques that are utilized for masking sensitive IoT data based on the sensitivity level of the IoT data. The local data storage system 118 can include various types of storage systems such as storage systems that support high-performance storage and high-capacity storage, which are implemented using direct-attached storage (DAS) and/or network-attached storage (NAS), etc. The high-performance storage allows for moving large files and a large amount of data within the device network 110 to remote networks at relatively high data transfer rates (e.g., on the order of gigabytes per second) using known protocols. The high-performance storage is utilized to store and manage active data, while the higher capacity storage can be utilized to store and manage inactive data which is accessed on a relatively infrequent basis, as compared to the active data which is accessed on a relatively frequent basis.

The computing device 120 may comprise one of various types of computing devices such as a desktop computer, a laptop computer, a server, a smart phone, an electronic tablet, etc., which allows a user or administrator to access the cloud computing system 140 and/or the device network 110 over the communications network 130. In this regard, in some embodiments, the IoT application 122 may be utilized to configure and manage the device network 110 and IoT devices 112. In other embodiments, the IoT application 122 may be utilized to access and process IoT data which is uploaded by the network of IoT devices 112 and stored in the cloud computing system 140.

While the communications network 130 is generically depicted in FIG. 1, it is to be understood that the communications network 130 may comprise any known communication network such as, a global computer network (e.g., the Internet), a wide area network (WAN), a local area network (LAN), a satellite network, a telephone or cable network, a cellular network, a wireless network such as Wi-Fi or WiMAX, or various portions or combinations of these and other types of networks. The term "network" as used herein is therefore intended to be broadly construed so as to encompass a wide variety of different network arrangements, including combinations of multiple networks possibly of different types. In this regard, in some embodiments, the communications network 130 comprises combinations of multiple different types of communications networks each comprising network devices configured to communicate using Internet Protocol (IP) or other related communication protocols. The communications network 130 comprises intermediate points (such as routers, switches, etc.) and other elements (e.g., gateways) that form a network backbone to establish communication paths and enable communication between network endpoints.

In some embodiments, the cloud computing system 140 is configured to support one or more application domains including, but not limited to, healthcare, home and building, retail, energy, manufacturing, transportation, logistics, and media application domains. The cloud computing system 140 manages and processes IoT data generated by various IoT devices 112 across one or more application domains. In some embodiments, the cloud computing system 140 performs data processing, data storage, and data management functions to support one or more IoT network applications and/or other types of high performance computing (HPC) applications such as deep learning applications, machine learning, big data analytics, or other types of HPC applications that are typically implemented using a public cloud-based service system to deliver consumer or business applications and services to multiple end users, service providers, and/or organizations. In other embodiments, the cloud computing system 140 comprises a private cloud platform that is accessible by a single organization, for example.

For cloud-based IoT computing, the server nodes 150 comprise application servers that are configured to host and manage one or more IoT applications, which are used by multiple, simultaneously connected users and/or entities in one or more application domains. Depending on the implementation of the cloud computing system 140, the server nodes 150 are configured to, e.g., execute business logic, execute scripts and services to query databases, and perform other computing functions that are needed to host and deliver IoT applications and services to multiple end users, service providers, and/or organizations. The server nodes 150 and the constituent system components of the cloud computing system 140 are implemented using (i) a cluster of servers that reside in a single facility (e.g., data center facility of private company) or (ii) a cluster of servers that reside in two or more data center facilities or remote locations (distributed over a cloud network) of a given service provider, for example. Furthermore, in some embodiments, the server nodes 150 implement methods that are configured to perform secured computations on encrypted or masked IoT data.

The computing system network 160 is configured to enable communication between the server nodes 150 and other computing nodes within the cloud computing system 140. Depending on the network distribution and geographic location of the constituent components and nodes of the cloud computing system 140, the computing system network 160 may comprise, for example, a LAN, a WAN, or a combination of one or more LANs and WANs, as well as other types of communication networks that are commonly used to implement cloud computing systems. The computing system network 160 further comprises a storage network fabric to enable shared access to the storage nodes 172 of the data storage system 170 by the various server and computing nodes within the cloud computing system 140. In some embodiments, the computing system network 160 comprises a converged Ethernet framework which integrates a storage network (for accessing the data storage system 170) and a front-end network (e.g., LAN and/or WAN) for accessing the server nodes 150 and enabling peer-to-peer communication between the server nodes 150.

The data storage system 170 may comprise any type of data storage system, or a combination of data storage systems, including, but not limited to, a storage area network (SAN) system, a network attached storage (NAS) system, dynamic scale-out data storage systems, or other types of distributed data storage systems comprising software-defined storage, clustered or distributed virtual and/or physical infrastructure. The term "data storage system" as used herein should be broadly construed and not viewed as being limited to storage systems of any particular type or types. In some embodiments, the data storage system 170 comprises a dynamic scale-out data storage system which allows additional storage nodes 172 to be added to the cluster to scale the performance and storage capacity of the data storage system 170. It is to be noted that each storage node 172 and its associated storage device array 190 is an example of what is more generally referred to herein as a "storage system" or a "storage array."

In some embodiments, each storage node 172 comprises a storage server that is implemented on, e.g., a physical server machine or storage appliance comprising hardware processors, system memory, and other hardware resources that execute software and firmware to implement the functionalities of the storage node 172 and the storage control system 180. In some embodiments, each storage node 172 comprises a plurality of storage control processors which execute a lightweight operating system (e.g., a customized lightweight Linux kernel) and functional software (e.g., software-defined storage software) to implement various functions of the storage node 172 and the storage control system 180, wherein such functions include, but are not limited to, (i) managing and executing data access requests by the server nodes 150, (ii) aggregating/pooling storage capacity (e.g., storage device arrays 190) of the storage nodes 172, (iii) performing various data management and storage services, and (iv) controlling network communication and connectivity with the server nodes 150 and between the storage nodes 172 within the cluster, etc. In exemplary embodiments where the data storage system 170 comprises a cluster of storage nodes 172, the storage control systems 180 of the storage node cluster can communicate in a cooperative manner to, e.g., process data access requests received from the server nodes 150, aggregate/pool the storage capacity (e.g., storage device arrays 190) of the storage nodes 172, etc.

In some embodiments, the intelligent IoT data storage management system 182 implements methods that are configured to store IoT data (in an encrypted format, masked format, plaintext format, etc.) in a federated database system and manage access to the federated database system. by aggregating/pooling storage capacity of the storage nodes 172 The IoT data is stored in different databases or file repositories depending on, e.g., the type of IoT data (e.g., structured, unstructured), the encryption type/level applied to the IoT data, the type of secured data analytics that are to be applied to process the IoT data, the classified security tier of the IoT data, etc. In some embodiments, the intelligent IoT data storage management system 182 implements functions as discussed in further detail below in conjunction with FIG. 5. Furthermore, in some embodiments, the data protection services 184 perform functions such as such as inline data compression/decompression, deduplication, thin provisioning, and data protection functions such as data replication (synchronous and/or asynchronous), snapshots, data backup, Reed-Solomon error correction coding, and other data protection schemes based on data striping and parity (e.g., RAID), and other types of data management functions, depending on the system configuration.

Further, the storage devices of the storage device arrays 190 of the storage node 172 comprise one or more of various types of storage device such as hard-disk drives (HDDs), solid-state drives (SSDs), Flash memory cards, or other types of non-volatile memory (NVM) devices including, but not limited to, non-volatile random-access memory (NVRAM), phase-change RAM (PC-RAM), magnetic RAM (MRAM), etc. In some embodiments, the storage devices comprise Flash memory devices such as NAND flash memory, NOR flash memory, etc. The NAND flash memory can include single-level cell (SLC) devices, multi-level cell (MLC) devices, triple-level cell (TLC) devices, or quad-level cell (QLC) devices. These and various combinations of multiple different types of storage devices may be implemented in the storage device array 190 in each storage node 172. In this regard, the term "storage device" as used herein should be broadly construed to encompass all types of persistent storage media including hybrid drives. On a given storage node 172, the storage control system 180 communicates with the data storage devices through any suitable host interface, e.g., a host bus adapter, using suitable protocols such as Advanced Technology Attachment (ATA), serial ATA (SATA), external SATA (eSATA), parallel ATA (PATA), non-volatile memory express (NVMe), small computer system interface (SCSI), serial attached SCSI (SAS), peripheral component interconnect express (PCIe), etc.

Figure 2:
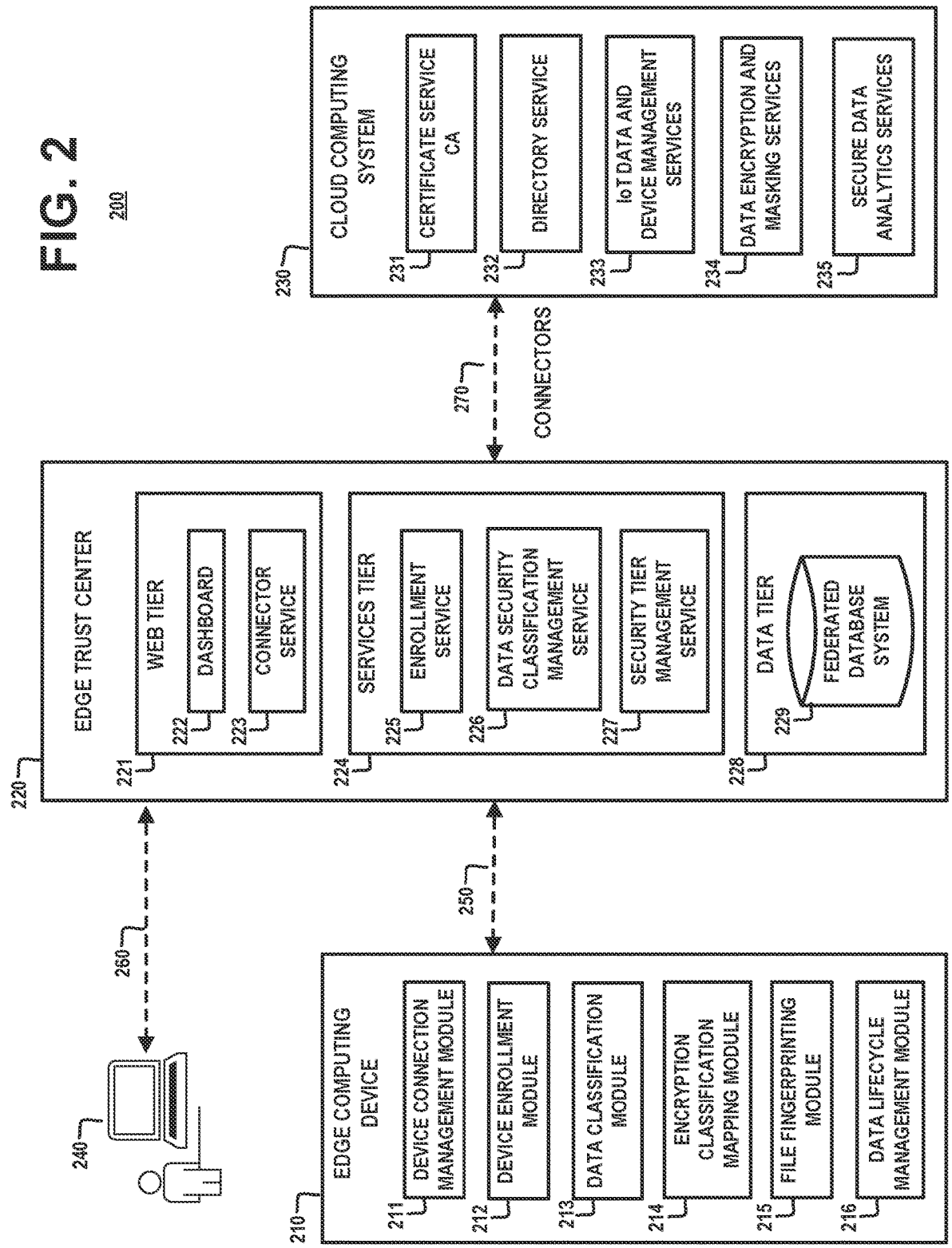
FIG. 2 schematically illustrates a system to provide secure data management in a network computing environment, according to another exemplary embodiment of the disclosure.

FIG. 2 schematically illustrates a system to provide secure data management in a network computing environment, according to another exemplary embodiment of the disclosure. More specifically, FIG. 2 illustrates a system 200 which comprises an edge computing device 210, an edge trust center 220, a cloud computing system 230, and at least one client computing device 240. The edge computing device 210 comprises a device connection management module 211, a device enrollment module 212, a data classification module 213, an encryption classification mapping module 214, a file fingerprinting module 215, and a data lifecycle management module 216, the functions of which will be explained in further detail below. The edge trust center 220 comprises multiple tiers including: (i) a web tier 221 which comprises a dashboard module 222, and a connector service module 223; (ii) a services tier 224 which comprises a device enrollment service 225, a data security classification management service 226, and a security tier management service 227; and (iii) a data tier 228 which is configured to manage and access a federated database system 229. Moreover, in some embodiments, the cloud computing system 230 comprises a certificate service 231 (or a certificate authority (CA)), a directory service 232, IoT data and device management services 233, data encryption and masking services 234, and secure data analytics services 235, the functions of which will be explained in further detail below.

In some embodiments, the edge computing device 210 and the edge trust center 220 provide an exemplary embodiment of the security management system 116 of the edge computing system 114 of FIG. 1. In some embodiments, the edge computing device 210 and the edge trust center 220 are implemented in an edge gateway server. In some embodiments, edge trust center 220 is implemented in an edge gateway server and the edge computing device 210 comprises a computing device (e.g., computer server) which is separate from the edge gateway server. While only one edge computing device 210 is shown for ease of illustration, it is to be understood that the system 200 can include multiple edge computing devices which implement the same or similar functional modules of the edge computing device 210 as shown in FIG. 2.

The edge computing device 210, the edge trust center 220, and the cloud computing system 230 collectively operate to provide secure data management in a network computing environment. The edge computing device 210 is configured to connect and interact with one or more IoT devices within a device network. The edge computing device 210 and the edge trust center 220 are configured to connect and communicate in a secured manner to perform various security management functions, as explained below. In some embodiments, edge computing device 210 and the edge trust center 220 securely communicate over secured network connections 250 using, e.g., Hypertext Transfer Protocol Secure (HTTPS) or a Cryptographic Message Syntax (CMS) standard such as Public-Key Cryptography Standards #7 (PKCS #7), which is used in a PKI system to digitally sign, authenticate, and/or encrypt digital data. The edge trust center 220 is configured to connect and interact with the cloud computing system 230 to access various services provided by the cloud computing system 230. In this regard, the edge trust center 220 comprises a centralized security system which is configured to operate within an IoT network (or machine-to-machine communication network) as a security layer between a plurality of IoT devices operating within the network and the cloud computing system 230 which provides data storage and/or data processing services for IoT data generated by the IoT devices.

Furthermore, a system user (e.g., network administrator) utilizes the client computing device 240 to connect to the edge trust center 220 over a secured connection 260 (e.g., HTTPS) to perform various operations (via components of the web tier 221) such as setting up and configuring IoT devices in the device network and accessing and configuring services of the cloud computing system 230 to support various operations withing the device network. For example, the administrator can utilize the dashboard 222 for information and business intelligence management and to communicate with the services tier 224 and data tier 228 though application program interface (API) calls. In addition, the connector service 223 is configured to create service connectors 270 to access the various services provided by the cloud computing system 230. The service connectors 270 configure and specify the flow of data and communication between the cloud services and the various services of the services tier 224.

In the cloud computing system 230, the certificate service 231 serves as a trusted entity that issues digital certificates, wherein a digital certificate certifies the ownership of a public key by a named subject of the digital certificate. In the system 200 of FIG. 2, the certificate service 231 implements methods to validate the identity of the edge trust center 220 and bind the edge securing tiering management system 220 to cryptographic keys through the issuance of a digital certificate. More specifically, in some embodiments, as part of a registration process, the edge trust center 220 will generate a certificate signing request (via the device enrollment service 225) and transmit the request to certificate service 231 of the cloud computing system 230, wherein the client certificate signing request comprises a message to request the signing of a public key and other relevant information of the edge trust center 220. The request is signed using a private key of the edge trust center 220 to prove that the edge trust center 220 has control of the private key that corresponds to the public key included in the certification signing request. Once the information in the certificate signing request passes a vetting process and domain control is established, the certificate service 231 of the cloud computing system 230 (or any other recognized Certificate Authority utilized by the service provider of the cloud computing system 230) will sign the public key of the edge trust center 220 so that the public key of the edge trust center 220 can be trusted. The edge trust center 220 will then receive a signed digital certificate (e.g., secured sockets layer (SSL) certificate) which is utilized to, e.g., authenticate the identity and credentials of the edge trust center 220 when communicating with the cloud computing system 230, to establish a secure connection between the edge trust center 220 and the cloud computing system 230, and to verify the integrity of documents that are signed by the edge trust center 220 using the digital certificate.

The directory service 232 is implemented by a directory server of the cloud computing system 230. The directory service 232 comprises a shared information source which provides information regarding services and resources that are provided by the cloud computing system 230, and maps such services and resources to respective network addresses to enable access to such services and resources.

The IoT data and device management services 233 provide services for IoT devices (e.g., sensors, edge computing devices, etc.). The IoT data and device management services 233 provide services that allow a user to build, deploy, configure, and manage IoT devices and IoT software in the IoT network environment. The IoT data and device management services 233 are utilized to program IoT edge devices and edge computing systems to perform local processing operations (e.g., decryption, messaging, data management, analytics, etc.) on IoT data that is generated, and to filter and aggregate IoT device data to transmit data to the cloud computing system 230 for storage and/or analysis. The IoT data and device management services 233 provide services to seamlessly connect edge devices to services of the cloud computing system 230 in a secured manner.

The data encryption and masking services 234 of the cloud computing system 230 implement various types of data encryption and/or masking techniques to protect IoT data that is stored and/or processed by the cloud computing system 230. For example, the data encryption and masking services 234 implement cryptographic encryption techniques (e.g., symmetric key or asymmetric key encryption) to encrypt IoT data using cryptographic keys. By way of example, in some embodiments, the data encryption and masking services 234 implement AES (Advanced Encryption Standard) encryption methods which utilize block ciphers e.g., AES-128, AES-192 and AES-256, to encrypt and decrypt data in blocks of 128 bits using cryptographic keys of size 128-bits, 192-bits and 256-bits, respectively. In other embodiments, data masking techniques such as data shuffling, data scrambling, data substitution, value variance, etc., are implemented to protect data. The type of data masking technique that is applied to IoT data for protection will vary depending on, e.g., the sensitivity level of the IoT data.

The secure data analytics services 235 implement methods to provide computing on masked data (CMD) which allow computations to be performed directly on encrypted/masked data, and to generate computing results in encrypted/masked form. With CMD, the confidentiality of the stored data and processing results are preserved, while ensuring that only authorized users with the proper keys can decrypt/unmask the data and associated data processing results. For example, in the healthcare domain, CMD can be applied to process encrypted medical data to provide predictive analytics services. For secure database queries, CMD can be used to allow SQL queries to be applied on encrypted data. In some embodiments, the secure data analytics services 235 implement homomorphic encryption methods which allow computations to be performed on encrypted data without having to first decrypt the data. The result of the computation is in an encrypted form, when decrypted the output is the same as if the operations had been performed on the unencrypted data. The fully homomorphic encryption methods are highly secure with minimal data leakage, but have high compute overheads. In other embodiments, less secure, and computationally less expensive methods such as deterministic encryption (DET) and order-preserving encryption (OPE) are implemented to support CMD services.

As noted above, the edge computing device 210 and edge trust center 220 implement various methods for secure management of IoT data in the IoT network environment. For example, in the edge computing device 210, the device connection management module 211 is configured manage secure network connections between the edge computing device 210 and one more IoT devices in a device network (e.g., IoT devices 112 in the device network 110, FIG. 1). The network connections include, e.g., Wi-Fi connections, Ethernet connections, Bluetooth connections, USB (universal serial bus) connections, etc. In this configuration, the edge computing device 210 is configured to collect, aggregate, and manage data (e.g., sensor data) that is generated by the IoT devices connected to the edge computing device 210, and to provide various security functions.

The device enrollment module 212 of the edge computing device 210 implements methods that are configured to enroll IoT devices in the IoT network. The device enrollment module 212 operates in conjunction with the device enrollment service 225 of the edge trust center 220 to perform a cryptographic enrollment process to securely add an IoT device into the IoT device network. An exemplary device enrollment process will be discussed in further detail below in conjunction with FIG. 7. In some embodiments, the device enrollment module 212 of the edge computing device 210 and the device enrollment service 225 of the edge trust center 220 utilize a cryptographic protocol, such as Enrollment over Secure Transport (EST) to perform a device enrollment process. As is known in the art, EST implements an X.509 certificate management protocol for public key infrastructure (PKI) clients that need to acquire client certificates and associated CA certificates. In cryptography, X.509 is a standard which defines a format of public key certificates, which are used in various protocols, such as Transport Layer Security (TLS) and Secure Sockets Layer (SSL), to establish authenticated and encrypted links between networked devices via, e.g., HTTPS. The X.509 standard format for public key certificates defines digital certificates that securely associate cryptographic key pairs with the identities of entities or individuals.

The data classification module 213 implements methods that are configured to classify a data sensitivity level of IoT data of IoT devices in the device network. In some embodiments, IoT data can be classified into one more of a plurality of predefined sensitivity levels, such as (i) high sensitivity, (ii) medium sensitivity, (iii) low sensitivity, and (iv) clear (or not sensitive). While these classifications are generically described, in practice, the sensitivity labels could vary depending on the application domain, and have different meanings depending on the application domain.

In some embodiments, the data classification module 213 classifies the data sensitivity level of IoT data based on various information, including but not limited to data content, device type, user-defined or system-generated data sensitivity classification rules, security policies, data usage, etc. For example, content-based classification involves classifying IoT data based on the IoT data content. For example, medical data can be classified as high-sensitivity to comply with regulatory requirements for controlling access to medical data, while environmental IoT sensor data for some application domains can be classified as low-sensitivity or clear (plaintext). In some embodiments, context-based classification is utilized to classify IoT data based on the type of IoT devices that generated the IoT data, or the given application domain in which the IoT data is generated and processed for the given application. Further, rules-based classification is utilized to classify IoT based on user-defined data sensitivity rules or system-defined (e.g., learned) sensitivity rules.

The encryption classification mapping module 214 implements methods that are configured to map each of the plurality of predefined data sensitivity levels to one or more types/levels of encryption. In this manner, when the data classification module 213 classifies the data sensitivity of a given IoT dataset, the encryption classification mapping module 214 will proceed to determine at least one type/level of encryption that is to be applied to the IoT dataset based on the classified data sensitivity level of the given IoT dataset. In some embodiments, each of the predefined sensitivity levels (other than the "clear" or plaintext sensitivity level) specify one or more types/levels of encryption or data masking techniques that can be applied to IoT data to meet the level of data protection associated with the sensitivity levels.

In the edge trust center 220, the data security classification management service 226 is configured to communicate with the cloud computing system 230 to determine the types of data encryption and masking services 234 and secure data analytics services 235 (collectively, security services) that are offered by the cloud computing system 230. The data security classification management service 226 utilizes such security services information to associate the types/levels of encryption, which are specified by the predefined data sensitivity levels, to the actual security services that are offered by the cloud computing system 230.

The security tier management service 227 implements methods that are configured to determine a security tier within the cloud computing system 230 (or within the local data storage system) for storing and/or processing IoT data. The security tier management service 227 will determine a proper security tier for a given IoT dataset based on, e.g., the type of data format (e.g., structured, unstructured, etc.), the location of where the IoT data is to be stored (e.g., local on premises, or remotely in one or more cloud computing systems), the determined data sensitivity level of the IoT data, whether the IoT data is to be stored only, analyzed only, or stored and analyzed, the expected read intensity of the stored data, etc.

More specifically, cloud providers typically provide multiple options for data storage and/or data analytics. For example, such options include a "persistent store only" option with no data analytics. In this case, the IoT data can be stored at rest in either encrypted/masked format or plaintext, without an interface to support data analytics of the stored date. Further, such options include a "data analytics only" option wherein an IoT dataset can only be analyzed with a specific data analytics interface, but not persistently stored. In this instance, the IoT dataset can be in plaintext form and analyzed in plaintext form, or the IoT dataset can be encrypted/masked with a secured analytics interface to enable computing on the encrypted/masked IoT data. Moreover, such options include a "persistent store and data analytics" option where the IoT datasets are secured/stored at rest and have an analyzing interface (depending on user privilege).

In view of the above, the security management system (implemented by, e.g., various modules of the edge computing device 210 and the edge trust center 220) provides functionality to create customized policies based on classifying data flows generated by underlying IoT systems (smart homes, manufacturers, aviation, connected cars, etc.) to enable better leverage of various encryption algorithms and secure data services offered by cloud systems. Indeed, the IoT systems typically generate continuous streaming datasets 24 hours per day, 7 days per week, from massive sensors and devices. Some IoT datasets have various degrees of sensitivity, e.g., personal wearable devices, healthcare devices, video surveillance, car location, etc. Many of these IoT datasets will exist in the cloud for a long time and provide value via (real-time, batched, or hybrid) analytics for pattern detection and prediction. Other IoT datasets may disappear rather quickly to save on cloud computing costs.

Today's cloud systems, however, are typically limited to all-or-nothing encryption approaches that do not leverage the variety of options noted above. This leads to the following problems. For example, homogenous security for all IoT analytics is not desirable. Indeed, a main problem, especially for large data sets, is the "all-or-nothing" policy for encrypting data, disallowing users to easily perform fine grained actions such as sharing records or searches. When all users, and all aspects of the underlying infrastructure, operate under the same encryption paradigm, this will tie a corporation to the same level of leakage for all IoT data, for example. In this regard, coarse-grained, homogeneous security mechanisms provide no data classification security granularity and force data that could otherwise be shared into more restrictive categories. Similarly, data with higher sensitivity is often placed into analytic repositories that have an unacceptable potential level of leakage.

Even when cloud systems do offer different options for heterogenous secure-based analytic services, the advertisement of such options in the cloud are non-standard. In addition, there is no cost model for different forms of heterogeneous security services. The algorithm for a gateway device selecting a security service provider, based on security services for analytics, does not exist. Moreover, existing systems do not allow for data classification and mapping at an IoT gateway. Indeed, there is currently no way to classify data at the gateway level in a way that maps to security analytic services at the cloud level. Furthermore, existing systems do not implement methods to increase or decrease security classification. In particular, there is currently no way to instruct a cloud provider to provide tiered conversion of data in the cloud to either decrease the leakage (at a higher compute cost and fee) or decrease the cost by accepting a higher level of leakage. Moreover, there is also no way to perform this in a time-lapsed fashion (the data only needs to be secure for the first week, when it can then be downgraded to clear text).

These issues are addressed by the exemplary security management systems and methods as described herein, where the security management system 116 (e.g., IoT edge gateway) is configured to determine security policies and requisite encryption levels to apply to different types of IoT data, and to determine the requisite security tiers for classifying and storing IoT data (either locally or remotely in the cloud), and to determine when IoT data should be moved from one security tier to another. Such techniques enable the realization of efficient and economical approaches for computing on the sensitive encrypted data (e.g., performing secured data analytics), and for minimizing the costs (e.g., financial costs and computing costs) for storing encrypted IoT data, as encrypted IoT data will need be decrypted when accessed from the backend storage to allow an authorized user to read the data. The data security management techniques as disclosed herein provide for IoT data handling in a way that allows an edge computing system to determine a proper security tier for IoT data residing in a cloud system and to make sure that when the IoT data is needed to be read or analyzed, the users do not have to pay for extra computing power unnecessarily (e.g., reduce the computing cost associated with analytics on masked/encrypted data) for IoT data that is encrypted at a given level that maybe greater than what is actually needed to adequately protect the IoT data with an acceptable leakage level.

In some embodiments, the data tier 228 comprises a database management system which is configured to implement a federated database system 229 which provides a single file system to manage and access IoT data that is stored locally (on premises) and remotely (in one or more cloud systems). The federated database system transparently maps multiple autonomous database systems into a single federated database, wherein the constituent databases are interconnected via a network and are geographically decentralized. The federated database system 229 utilizes data abstraction to provide a uniform user interface which enables, e.g., the security tier management service 227 to move IoT data between different security tiers.

In the edge computing device 210, the file fingerprinting module 215 implements file fingerprinting methods that are configured to generate a fingerprint for each IoT data file received by the edge computing device 210 from IoT devices. As is known in the art, a fingerprint of a given file comprises a data bit string which is mapped to the given file and uniquely identifies the given file. The file fingerprint is used for various purposes for identifying and tracking data across a network. For example, the file fingerprint is utilized for identifying data sensitivity of the file, tracking the activities of the file, tracking versions of the file, performing data deduplication operations, tracking user behavior, etc.

The data lifecycle management module 216 implements various methods that are configured to manage the data lifecycle of IoT data that is received by the edge computing device 210 from various IoT devices (e.g., IoT sensor devices) that are connected to the edge computing device 210. As is known in the art, the data lifecycle refers to the sequence of stages that a particular unit of data (e.g., IoT data) goes through including, for example, (i) initial generation or capture, (ii) maintenance, (iii) active use, (iv) archiving, and (v) deletion. In the context of an IoT computing environment, the initial generation stage involves the acquiring IoT data from one or more sources, such as IoT sensor devices or other types of IoT devices. The maintenance stage involves processing the IoT data prior to active use of the data, such as data aggregation, data scrubbing, extract, transform, load (ETL) processing, etc. The active use stage involves utilizing the data to perform one or more local (e.g., on premises) and/or remote (e.g., cloud computing) operations for one or more given application domains. The archiving stage involves removing data from active production environments, where the data is no longer processed or utilized, but stored for future use, if needed. The deletion stage (or purging stage) involves deleting all copies of data when the data is no longer needed. The operations that are performed by the data lifecycle management module 216 serves to optimize the usefulness and management of large amounts of data that is acquired and processed, which is typical in IoT computing environments.

Figure 3:
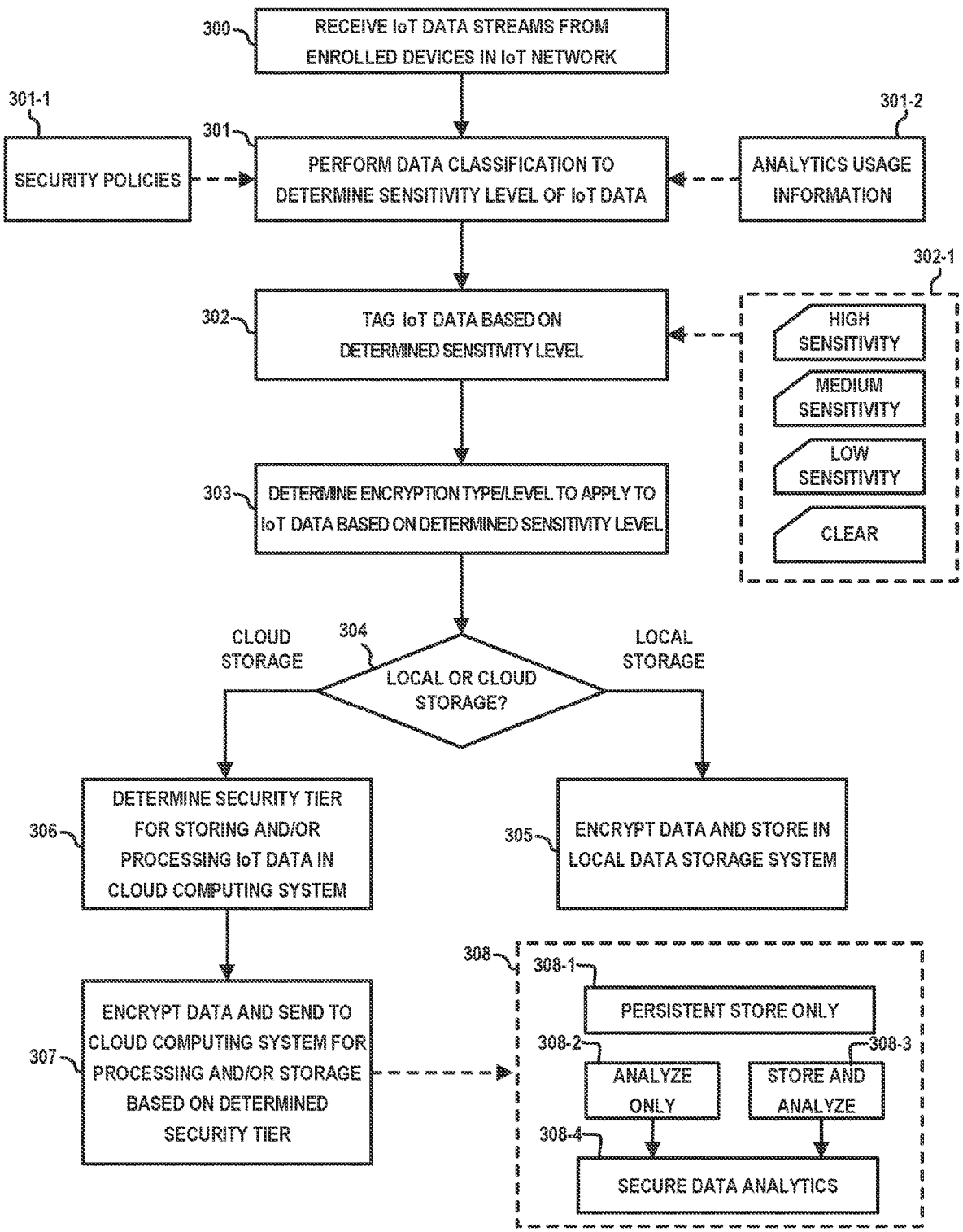
FIG. 3 illustrates a method to provide secure data management in a network computing environment, according to an exemplary embodiment of the disclosure.

FIG. 3 illustrates a method for providing secure data management in a network computing environment, according to an exemplary embodiment of the disclosure. In some embodiments, FIG. 3 illustrates exemplary modes of operation of the security management system 116 (FIG. 1) and/or the edge computing device 210 and edge trust center 220 (FIG. 2). The method of FIG. 3 assumes that a device network is established and includes a plurality of IoT devices (e.g., sensor devices) which generate and send IoT data streams to the security management system of an edge computing system. The security management system receives the IoT data streams (e.g., streams of data files) from enrolled devices in the IoT network (block 300). For example, in some embodiments, the edge computing device 210 (FIG. 2) assigned to a given set of IoT devices in a given device network.

The security management system performs a data classification process to determine the data sensitivity level of the received IoT data (block 301). As noted above, the data classification can be performed based on various specifications and rules associated with security policies 301-1. Furthermore, in some embodiments, the data classification process can be performed based on data analytics usage information 301-2, which is generated using systems and methods as will be discussed in further detail below in conjunction with FIGS. 4A and 4B. The IoT data is then tagged or otherwise assigned a data sensitivity level based on results of the classification process (block 302). In some embodiments, the data sensitivity level is selected from a plurality of predefined data sensitivity levels 302-1 such as (i) high sensitivity, (ii) medium sensitivity, (iii) low sensitivity, and clear (no sensitivity).

The security management system then proceeds to determine a type and/or level of encryption to apply to the IoT data based on the determined data sensitivity level (block 303). The security management system will then determine whether the IoT data is to be stored locally or remotely in a cloud system (block 304). Such a determination can be made based on various factors such as, e.g., the data sensitivity level of the IoT data, the data access patterns associated with the IoT data, predefined rules or security policies, etc. If the security management system determines that the IoT data is to be locally stored, the security management system will proceed to encrypt the IoT data using a data encryption protocol which corresponds to the determined sensitivity level and store the encrypted data in a local data storage system (block 305).

On the other hand, if the security management system determines that the IoT data is to be remotely stored in a cloud system, the security management system will proceed to determine the proper security tier for storing and/or secured analytic processing of the IoT data in the cloud computing system (block 306) and then proceed to encrypt (optionally) the data and send the encrypted data to the cloud computing system for secured processing and/or storage based on the determined security tier (block 307). The security tier can be selected based on various available security tiers 308 including, e.g., persistent storage only 308-1, analyze only 308-2, or store and analyze 308-3, wherein the security tiers 308-2 and 308-3 will be determined based on the type of secure data analytics 308-4 to be performed on the encrypted/masked IoT data.

Figure 4A:
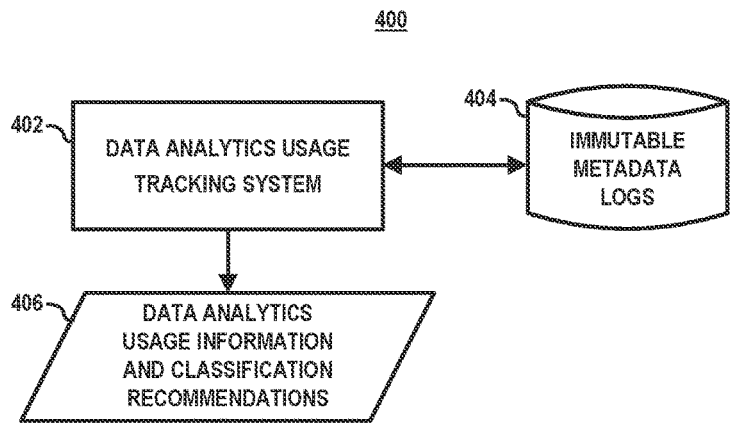
FIG. 4A schematically illustrates a system to generate data analytics usage information for use in classifying data sensitivity levels, according to an exemplary embodiment of the disclosure.

FIG. 4A schematically illustrates a system to generate data analytics usage information for use in classifying data sensitivity levels, according to an exemplary embodiment of the disclosure. More specifically, FIG. 4A schematically illustrates a system 400 comprising a data analytics usage tracking system 402, and a database of immutable metadata logs 404. The database of immutable metadata logs 404 comprises a plurality of immutable logs that trace the execution of data analytic jobs performed in a cloud computing system over time. In some embodiments, the data analytics usage tracking system 402 is a service that is implemented in a cloud computing system. The data analytics usage tracking system 402 is utilized by the security management system 116 (FIG. 1) to analyze a plurality of immutable logs that trace the execution of data analytic jobs performed in the cloud computing system at the request of authorized users of the IoT computing environment managed by the security management system 116. The data analytics usage tracking system 402 analyzes the relevant immutable logs and generates analytics usage information and associated classification recommendations 406. The analytics usage information and associated classification recommendations 406 are utilized by the data classification engine of the security management system 116 to update or otherwise modify the data sensitivity classification for certain IoT data and/or IoT devices based on actual data analytics usage of the IoT data.

Figure 4B:
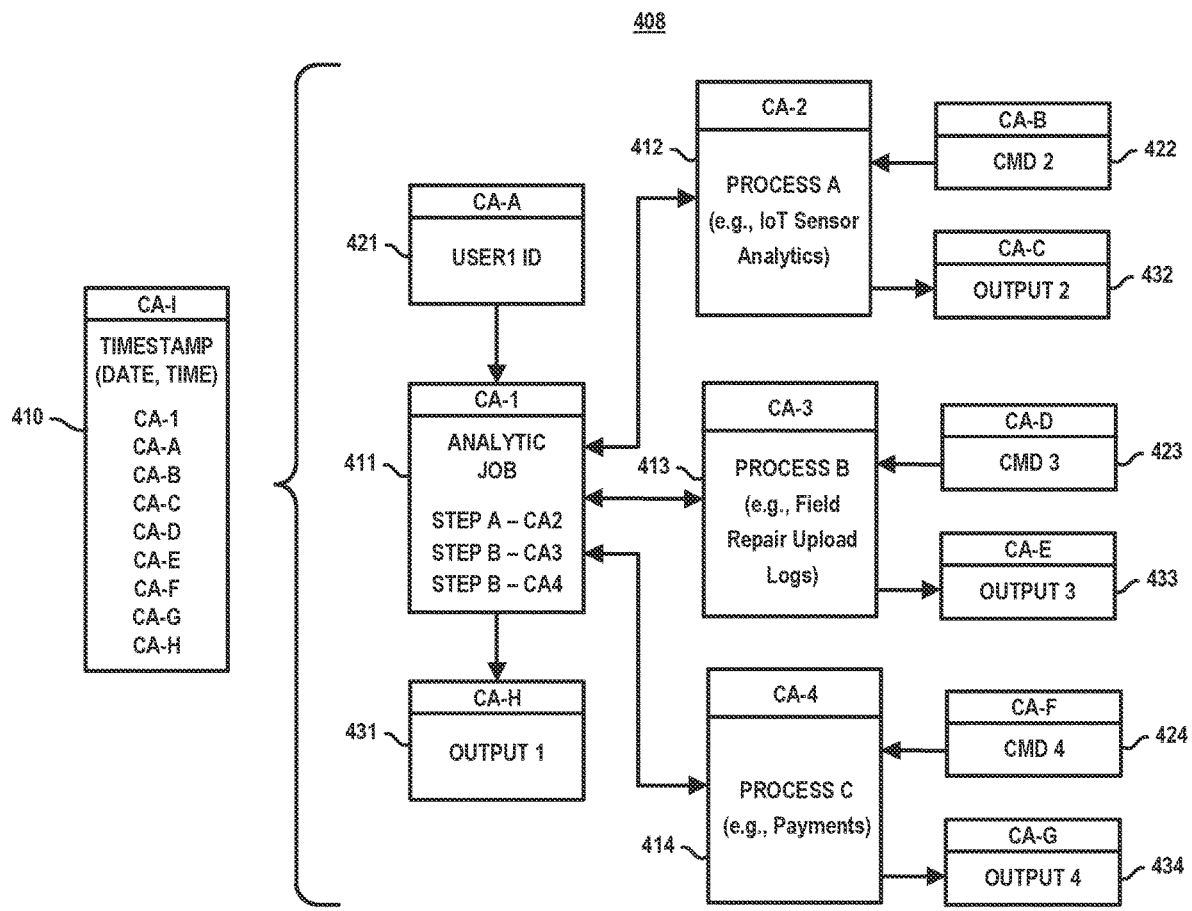
FIG. 4B illustrates an immutable data analytics log which can be utilized by a data analytics usage tracking system of FIG. 4A to track user analytic jobs that are performed in a cloud computing system, according to an exemplary embodiment of the disclosure.

In some embodiments, the immutable metadata logs are generated, managed, and stored using techniques as disclosed in U.S. Pat. No. 10,394,793, entitled "Method and System for Governed Replay for Compliance Applications," the disclosure of which is commonly assigned and fully incorporated herein by reference. In general, U.S. Pat. No. 10,394,793 discloses Governance, Risk, and Compliance (GRC) systems which implement object storage and content-addressable techniques to generate and manage immutable audit logs in a GRC framework to thereby enable, e.g., governed replay of point-in-time compliance reporting. FIG. 4B illustrates an exemplary embodiment of an immutable log which can be generated using techniques disclosed in U.S. Pat. No. 10,394,793, and which can be utilized by the data analytics usage tracking system 402 (FIG. 4A) to track user analytic jobs that are performed in the cloud system.

More specifically, FIG. 4B schematically illustrates an immutable log 408 which traces the execution of an analytic job performed by a user, e.g., User 1. The immutable log 408 comprises a plurality of immutable, content-addressable objects including a metarecord 410, a control object 411, process objects 412, 413, and 414, input objects 421, 422, 423, and 424, and output objects 431, 432, 433, and 434. The metarecord 410 has a content address CA-I. The control object 411 has a content address CA-1. The process objects 412, 413, and 414 have respective content addresses CA-2, CA-3, and CA-4. The input objects 421, 422, 423, and 424 have respective content addresses CA-A, CA-B, CA-D, and CA-F. The output objects 431, 432, 433, and 434 have respective content addresses CA-H, CA-C. CA-E and CA-G. These immutable, content-addressable objects can all be stored in a metadata lake for access and analysis at a time subsequent to their creation.

In the exemplary embodiment of FIG. 4B, the control object 411 represents a given analytic job that comprises a multi-step process (e.g., script) which, when executed, performs three separate CMD-based secure analytic processes, Process A 412, Process B 413, and Process C 414 using respective inputs 422, 423, and 424. In particular, as the control object 411 calls each process, Process A 412, Process B 413, and Process C 414, the processes will execute using respective inputs 422, 423, and 424 (e.g., input metadata), wherein such inputs are stored as immutable objects with their respective content addresses in, for example, a metadata lake. As each process, Process A 412, Process B 413, and Process C 414 executes, the respective outputs 432, 433 and 434 that are generated are stored in the metadata lake as immutable objects having respective content addresses. Once all processes Process A 412, Process B 413, and Process C 414 have completed, the metarecord 410 is created and stored in the metadata lake as an immutable record to maintain information regarding the execution of the control object 411.

As shown in FIG. 4B, the metarecord 410 comprises timestamp information indicating the date and time when the control object 411 (analytic job) was run in the cloud system, the content address CA-1 of the control object 411 that was run (which, in turn, includes the content addresses CA-2, CA-3, CA-4 of the processes Process A 412, Process B 413, and Process C 414 called by the control object 411) together with the respective content addresses CA-A, CA-B, CA-C, CA-D, CA-E, CA-F, CA-G, and CA-H of the input objects 421, 422, 423, and 424, and the output objects 431, 432, 433, and 434. Accordingly, the various objects can be stored and accessed by, e.g., the data analytics usage tracking system 402 (FIG. 4A).

In the exemplary embodiment of FIG. 4B, the input object 421 of the control object 411 comprises information of the user User1, which performed the analytic job, wherein the input object 421 comprises information such as a user identification (ID) and the user's authorization level (e.g., "top secret"), along with the data classification for each job (e.g., "confidential"). In this case, the steps are timestamped and stored with a content address to prove immutability. As hundreds and/or thousands of these operations are recorded, the resulting graphs are analyzed to determine whether or not USER1 needs or does not need a top-secret classification, or, for example, USER1 continually fails trying to run analytic jobs that operate on security classifications that are out of bounds. These types of discoveries can result in changes to user levels and/or classification levels. If the analysis performed by the data analytics usage tracking system 402 determines that an IoT dataset can be safely downgraded to a lower-level designation (e.g., top-secret to confidential), the sensitivity level of the IoT dataset can be downgraded to possibly save the company a significant amount on operational expenses for cloud computing resources. The company may run a cloud-based job to calculate these recommendations and then produce a recommendation (e.g., a script) that can be used to configure gateways to use new classifications on specific data sets.

Figure 5:
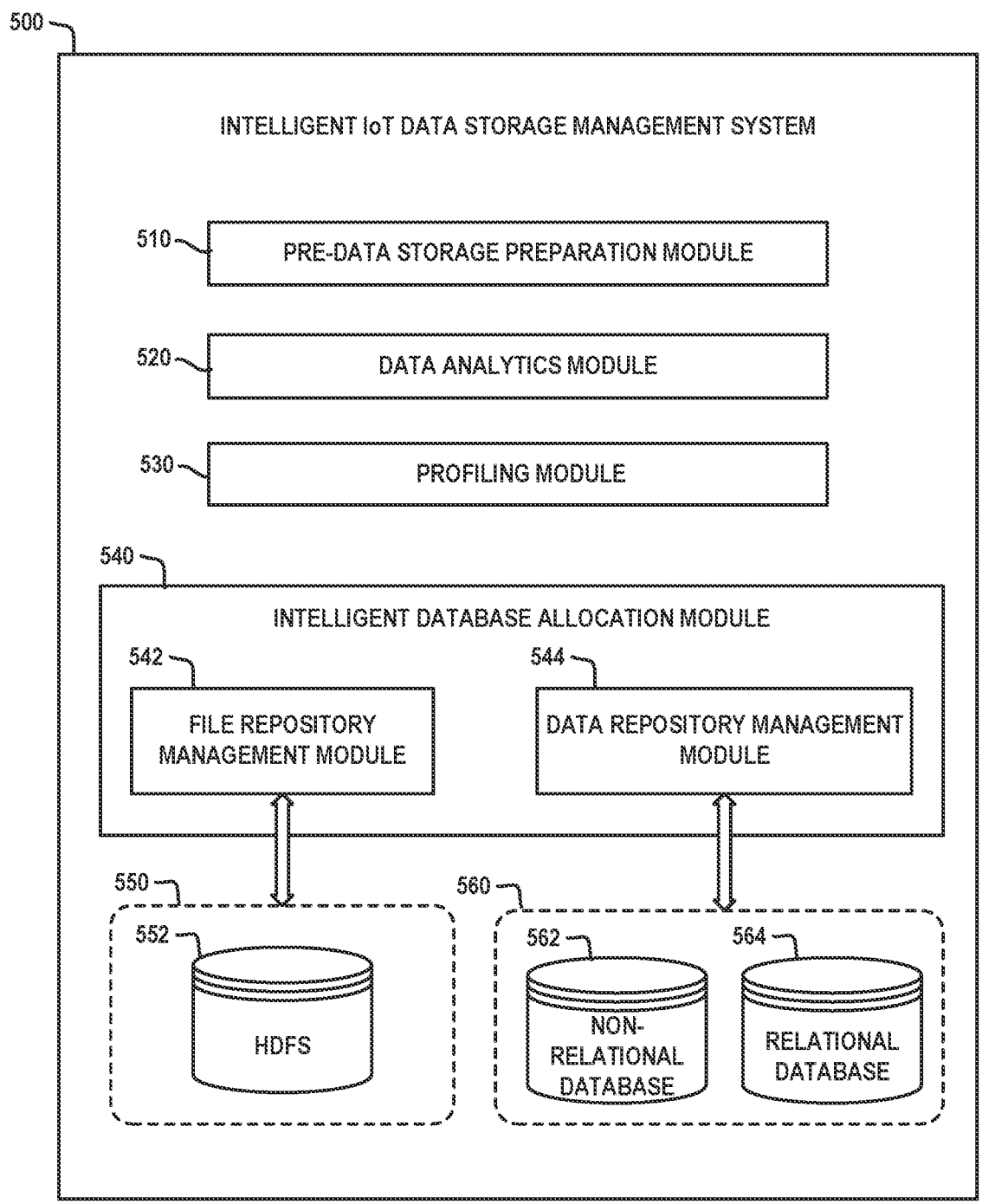
FIG. 5 schematically illustrates an intelligent data storage management system according to an exemplary embodiment of the invention.

FIG. 5 schematically illustrates an intelligent IoT data storage management system 500 according to an exemplary embodiment of the invention. In particular, FIG. 5 schematically illustrates an exemplary embodiment of the intelligent IoT data storage management system 182 which can be implemented in the cloud computing system 140 of FIG. 1. The intelligent data storage management system 500 comprises a pre-data storage preparation module 510, a data analytics module 520, a profiling module 530, and an intelligent database allocation module 540. The intelligent database allocation module 540 comprises a file repository management module 542 and a data repository management module 544. The file repository management module 542 is configured to manage one or more file repositories 550, and the data repository management module 544 is configured to manage one or more data repositories 560 (e.g., databases).

In some embodiments, the file repositories 550 are utilized to store and manage unstructured data, such as documents, images, digital audio files, video files, etc. In some embodiments, the file repositories 550 implement a distributed file system 552 such as the Hadoop distributed file system (HDFS). As is known in the art, HDFS is a storage framework for the Apache Hadoop software platform which allows for distributed storage and processing of big data using the MapReduce programming model. The Hadoop framework divides files into large blocks and distributes them across a plurality of nodes in a cluster, and transfers packaged code into the nodes to implement a data parallel processing framework. The file repository management module 542 comprises version control methods that are configured to store and manage multiple versions of files that are stored within the file repositories 550. A version control system implements methods to lock files so that the files can be modified by one user or application at a given time, and to track changes to the files. When a new file is generated or a current file is updated, the changes are "committed" to the file repository so that the latest version is available to authorized users or entities.

In some embodiments, the data repositories 560 implement a non-relational database 562 and a relational database 564. The non-relational database 562 is utilized to store and manage semi-structured data and possibly structured data. For example, the non-relational database 562 may be a distributed non-relational database such as MongoDB, which is a document-oriented database system that utilizes JSON-like documents with a given database schema for storing and managing semi-structured data. A semi-structured data model is a database model where there is no separation between the data and the schema, and the amount of structure that is specified depends on the purpose. Semi-structured data is a form of structured data that does not conform with the formal structure of data models associated with relational databases or other forms of data tables, but contains metadata to separate semantic elements and enforce hierarchies of records and fields within the data. The non-relational database 562 can be implemented using one or more of various data models, such as a column data model, a document data model, a key-value data model, a graph data model, etc.

The relational database 564 is utilized to store and manage structured data based on a relational model of data. In some embodiments, the relational database 564 is implemented using a structured query language (SQL) relational database management system (e.g., MySQL). The relational database 564 is utilized to store and manage structured information such as manufacturing and logistical information, personnel data, and other types of structured data. A SQL relational database is useful for storing and managing structured data that follows a strict schema, and managing relational data with the need for complex joins.

The pre-data storage preparation module 510 implements methods which are configured to determine or otherwise identify the data types (e.g., structured data, semi-structured data, unstructured data, etc.) of the IoT data which is uploaded to the cloud computing system 140 for storage. In addition, pre-processing of raw data is performed to facilitate batch processing of the raw data, wherein the types of data pre-processing functions will vary depending on the application and the type of data. For example, traffic data that is collected by a network of IoT devices can be pre-processed using data cleaning and summarization, followed by storage of the pre-processed traffic data for subsequent batch processing. As another example, image data that is received from IoT camera devices can be pre-processed using various methods that are commonly utilized to improve the image data by suppressing unwanted distortions or enhancing image features that are deemed important for further processing. Other image pre-processing techniques include geometric transformations of images (e.g., rotation, scaling, translation). By way of specific example, various types of data processing functions that are commonly performed on raw images of a training dataset for deep learning model training include decoding (e.g., converting JPEG files to raw RGB (red, green, blue) samples), data re-sizing, normalization, whitening, data augmentation operations (e.g., data rotations, shifts, flips), etc. For instance, image augmentation methods are applied to images within a training dataset to create multiple altered versions of the same image, thereby providing more images to use for the training process to enhance the accuracy of the deep learning model and thus, allow for enhanced classification/ inference processing.

The data analytics module 520 may implement various methods for processing non-decrypted or decrypted/masked IoT data depending on the application. For example, the data analytics module 520 can implement artificial intelligence or neural network processing techniques to analyze the pre-processed image data to perform, e.g., face detection or other image classification or analysis methods either in real-time or batch processing. As another example, big data analytic methods can be utilized to process a massive amount of traffic data to perform functions such as traffic prediction, etc.

The profiling module 530 implements methods that are configured to determine data input/output (I/O) access patterns of network devices (e.g., data write and data read patterns). The data I/O patterns are then utilized by various modules (e.g., the intelligent database allocation module 540, etc.) to make data storage allocation decisions that increase or otherwise optimize data storage utilization and data throughput of the cloud computing system 140. In addition, the profiling module 530 implements methods that are configured to determine profiles of IoT data and/or devices that generated the IoT data (e.g., low priority profile, high priority profile, etc.) based on factors such as the type of IoT data, the type of IoT devices that generated the IoT data, and the applications which process the IoT data, etc. The profiling allows the intelligent database allocation module 540 to determine whether to store data in a target memory tier of a hierarchical memory tier framework, or a target storage tier of a hierarchical storage tier framework. For example, a given type of data (e.g., water system sensor data) may be stored within an in-memory database for real time analysis.

The intelligent database allocation module 540 implements methods that are configured to dynamically select a given type of repository, storage tier, memory tier, etc., to store the data which is ingested by the cloud computing system 140. The database allocation is based on various factors including, but not limited to, the type of data, the type of IoT devices generating or accessing the data, the type of applications that process the data, etc. For example, the intelligent database allocation module 540 can determine whether a given type of data is to be stored in one of the file repositories 550 or data repositories 560 with a certain level of security or encryption hardening. In particular, image data (e.g., surveillance videos) may be stored in the file repository 550 (e.g., Hadoop) to enable batch analysis. In addition, semi-structured data may be stored in the non-relational database 562, while structured data may be stored in the relational database 564. Moreover, the intelligent database allocation module 540 can dynamically determine whether data should be stored in column-based database format or a row-based database format. In addition, depending on the type of data and the application processing the data, the intelligent database allocation module 540 can determine whether to store data in a target memory tier of a hierarchical memory tier framework, or a target storage tier of a hierarchical storage tier framework. For example, a given type of data (e.g., water system sensors) may be stored within an in-memory database for real time analysis.

In particular, a water quality monitoring system can be implemented using IoT sensors that are installed in, e.g., pipes, lakes, aquifers, rivers, streams, and other bodies of water that need to be monitored for water quality. In certain applications, there may be a need for real-time monitoring and analysis of water quality (e.g., pH, conductivity/resistivity, oxidation reduction potential, dissolved oxygen, etc.) to determine if and when the water quality is approaching a risky level. As another example, a heartbeat detection and cardiac monitoring system can be implemented using IoT medical sensor devices and associated medical analysis applications to track cardiac conditions of patients. In such instances, there may be a need for real-time monitoring and analysis of the cardiac functions of individuals that have undergone surgery or are known to be at risk for cardiac failure. In such instances, these high priority devices and applications can have data stored in low latency, high performance memory and/or storage tiers.

In other applications, IoT sensor device monitoring systems can capture data that needs to be analyzed in semi-real time or periodically. For example, IoT devices can be used to monitor and capture information regarding point of sale (POS) systems, or track the status of inventory and supply chain assets. In such instances, these such IoT devices and associated applications may be accorded a lower level of priority and stored in lower-performance memory or storage tiers, as the associated data may not need to be continuously accessed and processed in real-time. Instead, such data can be stored for periodic batch processing. In this regard, the intelligent database allocation module 540 can utilize the device profile and priority levels of the IoT devices and associated applications to optimize the storage and management of massive IoT data in the cloud computing platform.

As noted above, the edge security management system is configured to implement secured device enrollment and registration processes using, e.g., device enrollment module 212 (of the edge computing device 210), the device enrollment service 225 (of the edge trust center 220), and the certificate service 231 (of the cloud computing system 230), as shown in FIG. 2. In some embodiments, secured registration and enrollment of devices within the IoT device network are performed using techniques as disclosed in U.S. Pat. No. 10,419,931, entitled "Security for Network Computing Environment Using Centralized Security System," which is commonly assigned and fully incorporated herein by reference. For example, such techniques can be utilized to register the security management system 116 (FIG. 1) as a "security agent" for the device network 110. For example, in some embodiments, a registration process comprises initial registration operations such as establishing network configurations for the device network 110, generating cryptographic keys (e.g., public key and private key pair), and creating a public directory to store/host the public key. These initial registration operations can be performed manually by an administrator, automatically, or through a combination of manual and automated operations.

In particular, with regard to establishing network configurations, the administrator or the security agent establishes a secure network having a certain topology (linear, star, tree, mesh, etc.). The security agent is configured as a security manager of the device network 110 to monitor the device network and prevent network devices from joining the secured network in an ad hoc manner and self-organizing into a connected network without first registering with the security agent and becoming a "trusted" network device. At this point, the administrator can assign various IoT devices (e.g., sensor devices, edge devices, etc.) to have certain priority and/or security levels.

Further, as part of the initial registration process, in one embodiment of the invention, a cryptographic key/digital certificate processing module of the security agent is invoked to generate a SSH key pair using a public-key cryptographic process to generate a public key and corresponding private key. The security agent will then create a public directory (e.g., FTP (file transfer protocol) directory to host the SSH public key of the security agent. As is known in the art, SSH keys provide a mechanism for establishing secure communications between two network devices (e.g., client and severs) using public key cryptography and channel-response authentication. The public directory is accessible by network devices that are registered with the security agent to allow the registered network devices to obtain and utilize a copy of the public key for secure communications with the security agent. In particular, in the context of establishing secure communications between the security agent and a given IoT device 112 that is registered as a "trusted" device within the device network 110, the IoT device 112 can encrypt a message with the public key of the security agent to ensure that only the holder (security agent of the associated private key can decrypt the message. This is because any message encrypted with the public key can only be decrypted with the associated private key. In addition, the public key can be utilized by a registered network device to authenticate that a received message was generated by the holder (security agent) of the associated private key. This is because any message encrypted with the private key can only be decrypted with the public key.

Another step of the registration process comprises launching a zero-configuration networking daemon to announce/broadcast the public path to the public directory in which the SSH public key is stored. This process allows the security agent to provide information regarding the location of the SSH public key and allows network devices which join the network, and request registration for trusted status, to obtain a copy of the public key. Next, as discussed above, the security agent will generate a certificate signing request and transmit the request to the certificate service 231 of the cloud computing system 230 for signing, wherein the certificate authority utilized by the service provider of the computing system 230 will sign the public key of the security agent so that the public key can be publicly trusted. The security agent will then receive and install a signed client certificate. In one embodiment of the invention, the signed digital certificate comprises an SSL (secure sockets layer) certificate. As is known in the art, an SSL certificate comprise a digital certificate which authenticates the identity of a given entity and encrypts information sent to the given entity using an SSL protocol. In the context of embodiments described herein, an SSL certificate issued to the security agent serves to establish the credentials of the security agent when communicating with the cloud computing system 140. When the security agent attempts to communicate with a server of the cloud computing system 140, the SSL certificate of the security agent can be utilized to establish a secure connection. Once the security agent is registered with the cloud computing system 140, the security agent can proceed to register network devices to operate within the trusted network environment.

Figure 6:
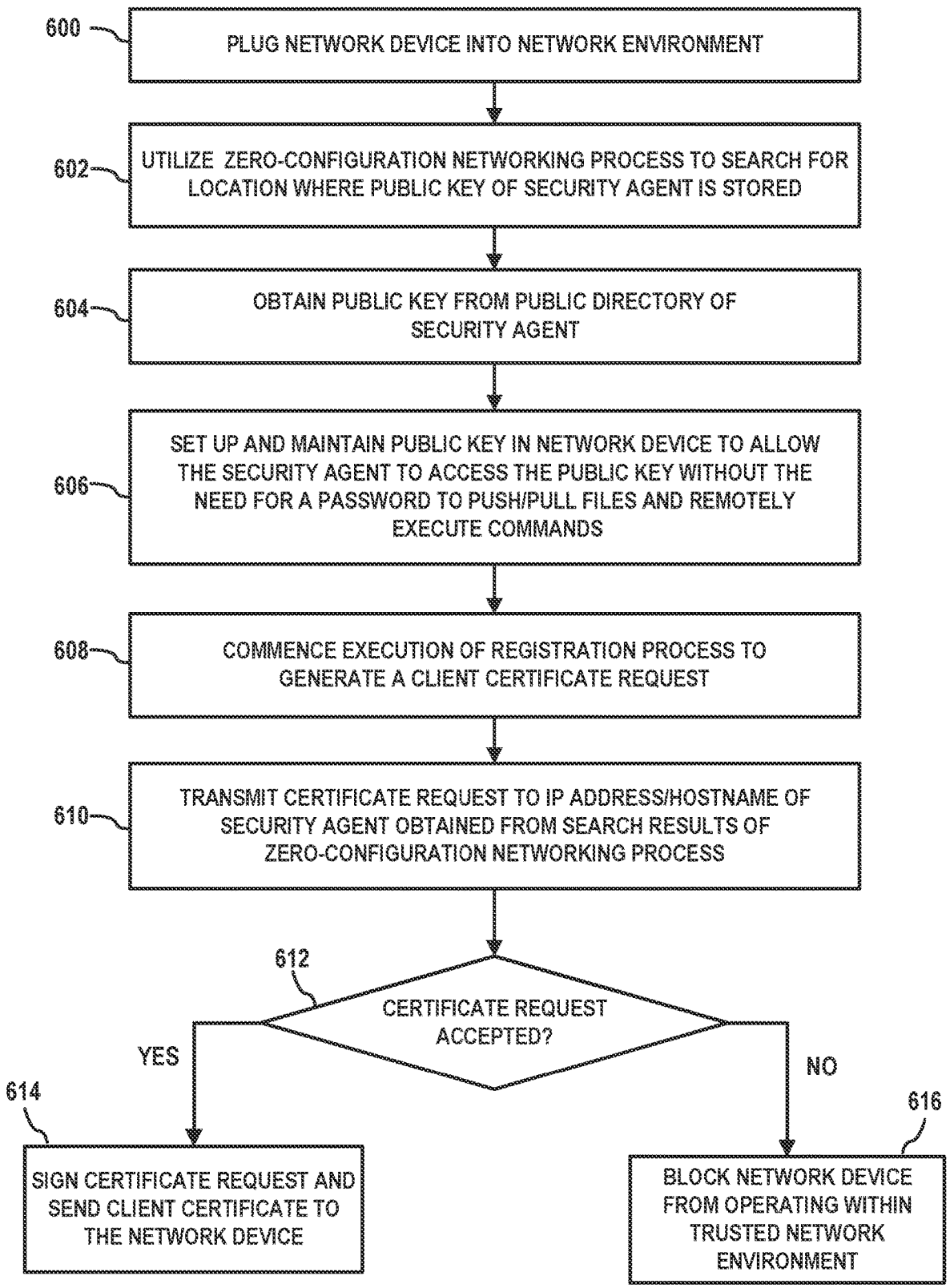
FIG. 6 illustrates a method for registering a network device to operate in a network computing environment managed by a security management system, according to an exemplary embodiment of the disclosure.

FIG. 6 is a flow diagram of a method for registering a network device to operate in a network computing environment managed by a security management system, according to an exemplary embodiment of the disclosure. More specifically, FIG. 6 illustrates a method for registering a network device with a security agent of the edge security management system 116 (FIG. 1) so that the network device can operate within a trusted and secured device network 110 that is managed by the security management system 116. As an initial step, a new network device is added to the trusted and secured device network 110 (block 600). Alternatively, the network device may already be included as part of an existing, unsecured network, which is being converted into a new trusted and secured network by a registered smart security agent. In this regard, the existing network device can be considered as being added to the newly established and configured network environment. In all instances, the newly added network device will utilize a Zeroconf process to search for the location (e.g., public FTP directory) where the public key of security agent is stored (block 602). The Zeroconf process is performed to obtain other relevant information such as the IP address and hostname of the security agent via, e.g., mDNS.

The network device will obtain the public key from the public directory of the security agent (block 604) and then setup and maintain the public key in way that allows the security agent to access the public key from the network device (without the need for a password) to push/pull files and to remotely execute commands (block 606). With this process, the public key (e.g., SSH public key) of the security agent resides on the network device, which allows the security agent to connect to the network device and "unlock" the network device by using the private key (e.g., private SSH key) of the security agent via an SSH protocol agent without the need for a password. The use of the SSH key allows the security agent to automatically authenticate the network device using an SSH key authentication process. For example, when the security agent attempts access to the network device, the network device will use the public key to construct and send a challenge to the security agent. The challenge comprises an encrypted message which is encrypted using the public key of the security agent. The security agent can decrypt the message using the private key and then generate and send a proper response to the network device.

Once the public SSH key of the security agent is setup, a registration process is commenced in which the network device generates a client certificate signing request (block 608). In some embodiments, the network device generates a request for a signed SSL certificate, and sends the request to the IP address/hostname of the security agent (block 610). As noted above, the IP address/hostname of the security agent comprises information that is obtained as a result of the previous Zeroconf search process (in block 602).

The request for a signed SSL certificate received from the network device is reviewed for acceptance or denial (block 612). If the request is accepted (affirmative result in block 612), the security agent will sign the request and send a signed SSL certificate to the network device using a suitable communications protocol (block 614). The issuance of the signed SSL certificate completes the registration process, and the network device is deemed "trusted" and is allowed to begin operating within the secured network environment. The signed SSL certificate is subsequently utilized by the security agent and the newly registered network device to communicate in a secure way using an SSL communications protocol.

On the other hand, if the request is not accepted (negative result in bock 612), the network device will be blocked from joining or otherwise operating within the secured network environment (block 616). In one embodiment, the network device will be added to a "black list," which prevents the network device from being added to the secured device network until the network device is removed from the black list. In one embodiment, the decision to accept or reject the request for a signed SSL certificate (in block 612) is made, at least in part, by the network administrator. For example, in one embodiment, all requests for SSL certificates from network devices can be held in a queue, and manually reviewed by the network administrator using a web console connected to the security management system 116 (FIG. 1).

In this regard, the network administrator has the option of accepting or rejecting requests for signed SSL certificates from network devices attempting to register and join the secured device network. In addition, the administrator can approve or otherwise modify the priority and/or security level for the device.

Once a given network device is registered with the security agent and has been issued a signed SSL certificate, the given network device is deemed "trusted" and can begin operating in the device network and communicating with the security agent. In some embodiments, the network devices can communicate with the smart security agent using XML-RPC, which is a remote procedure call (RPC) protocol that utilizes XML (extensible markup language) to encode the calls and utilizes HTTP as a transport mechanism. In other embodiments, communications can be implemented using REST (Representational State Transfer), which implements a stateless, client-server, cacheable communications protocol, as is known in the art.

A registered network device establishes a secure communications channel with the security agent using the signed SSL certificate issued to the registered network device. For example, in some embodiments, a secured SSL communications channel is generated using a standard SSL protocol. For example, the registered network device connects to the security agent and the security agent requests that the registered network device identify itself. The registered network device sends a copy of its signed SSL certificate to the security agent, and the security agent checks the SSL certificate against a list of issued SSL certificates to ensure that the SSL certificate is not expired, or revoked, and otherwise still valid. If the SSL certificate is deemed valid, the security agent can create and encrypt a symmetric session key using the SSH private key, and then send the encrypted session key to the registered network device. The registered network device can then decrypt the session key using the public SSH key of the security agent. The network device and smart security agent then communicate with messages that are encrypted using the session key.

Once the secured SSL communication session is established, the security agent will receive a request from the registered network device to perform some requested action. The request is encrypted using the session key. As noted above, the request can be implemented using XML-RPC or REST. The request will have some identifying information of the registered network device. For example, the identifying information comprises a serial number and firmware version of the registered network device. Other types of identifying information can be incorporated within the request. All requests that are sent from the registered network devices to the security agent will include identifying information of the associated network devices.

The security agent will then extract the identifying information from the request that is received from the registered network device. The extracted device identifying information is utilized by the security agent to validate the network device. For example, the security agent can validate the network device by comparing the extracted device identifying information of the network device (e.g., serial number, firmware version, etc.) against the corresponding identifying information of associated with the SSL certification of the registered device (as maintained by the security agent) to validate the identity of the registered network device. In other embodiments, the security agent can send the extracted device identifying information to a cloud computing system of a vendor of the network device to validate the authenticity of the network device.

If the security agent determines that the network device is valid, the smart security agent will service the request from the network device. On the other hand, if the security agent determines that the network device is not valid, the security agent can invalidate the digital certificate (e.g., SSL certificate) of the network device and block the network device from operating within the trusted device network. The network device will be included in the device "black list" of the security agent.

Figure 7:
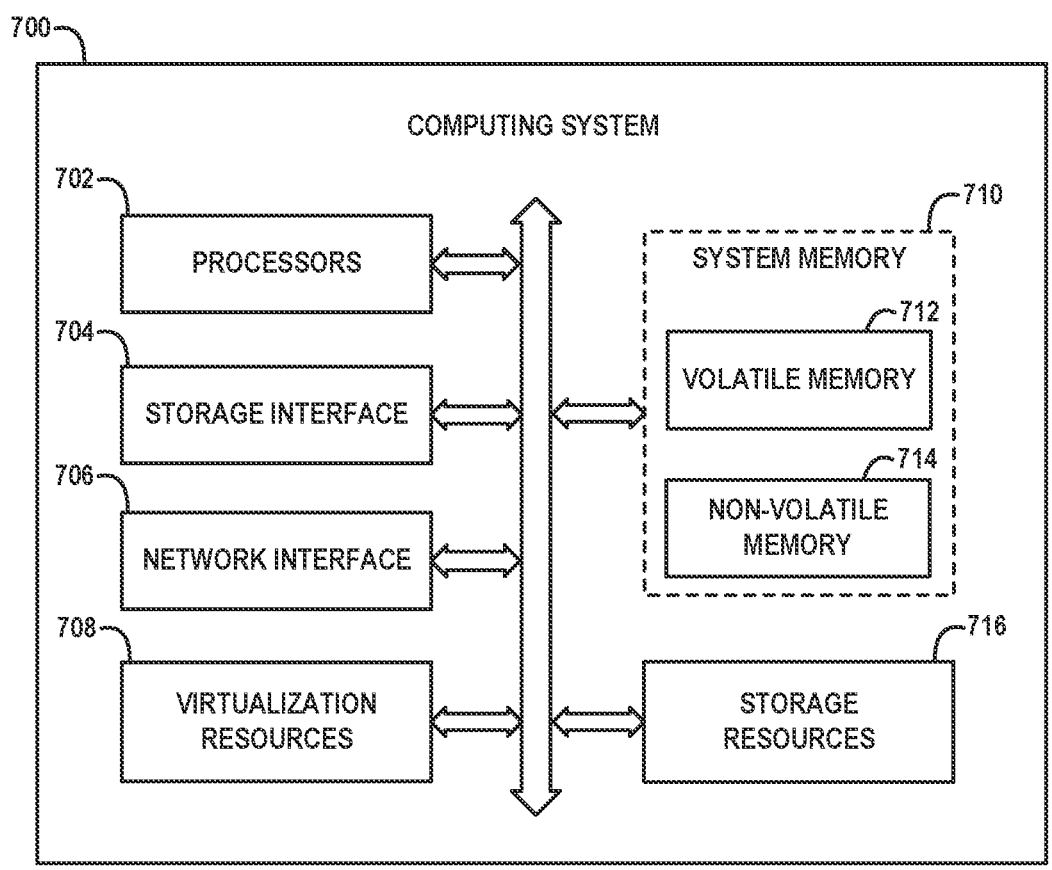
FIG. 7 schematically illustrates framework of a computing system which can host a security management system, according to an exemplary embodiment of the disclosure.

FIG. 7 schematically illustrates framework of a computing system 700 which can host a security management system, according to an exemplary embodiment of the disclosure. More specifically, in some embodiments, FIG. 7 illustrates an exemplary framework of, e.g., (i) a server node which can host the security management system 116 (FIG. 1), (ii) the edge computing device 210 (FIG. 2), and/or (iii) a server node (e.g., gateway server) which can host the edge trust center 220 (FIG. 2). The computing system 700 comprises processors 702, storage interface circuitry 704, network interface circuitry 706, virtualization resources 708, system memory 710, and storage resources 716. The system memory 710 comprises volatile memory 712 and non-volatile memory 714.

The processors 702 comprise one or more types of hardware processors that are configured to process program instructions and data to execute a native operating system (OS) and applications that run on the computing system 700. For example, the processors 702 may comprise one or more CPUs, microprocessors, microcontrollers, application specific integrated circuits (ASICs), field programmable gate arrays (FPGAs), and other types of processors, as well as portions or combinations of such processors. The term "processor" as used herein is intended to be broadly construed so as to include any type of processor that performs processing functions based on software, hardware, firmware, etc. For example, a "processor" is broadly construed so as to encompass all types of hardware processors including, for example, (i) general purpose processors which comprise "performance cores" (e.g., low latency cores), and (ii) workload-optimized processors, which comprise any possible combination of multiple "throughput cores" and/or multiple hardware-based accelerators. Examples of workload-optimized processors include, for example, graphics processing units (GPUs), digital signal processors (DSPs), system-on-chip (SoC), tensor processing units (TPUs), image processing units (IPUs), deep learning accelerators (DLAs), artificial intelligent (AI) accelerators, and other types of specialized processors or coprocessors that are configured to execute one or more fixed functions.

The storage interface circuitry 704 enables the processors 702 to interface and communicate with the system memory 710, the storage resources 716, and other local storage and off-infrastructure storage media, using one or more standard communication and/or storage control protocols to read data from or write data to volatile and non-volatile memory/storage devices. Such protocols include, but are not limited to, non-volatile memory express (NVMe), peripheral component interconnect express (PCIe), Parallel ATA (PATA), Serial ATA (SATA), Serial Attached SCSI (SAS), Fibre Channel, etc. The network interface circuitry 706 enables the computing system 700 to interface and communicate with a network and other system components. The network interface circuitry 706 comprises network controllers such as network cards and resources (e.g., network interface controllers (NICs) (e.g., SmartNICs, RDMA-enabled NICs), Host Bus Adapter (HBA) cards, Host Channel Adapter (HCA) cards, I/O adaptors, converged Ethernet adaptors, etc.) to support communication protocols and interfaces including, but not limited to, PCIe, DMA and RDMA data transfer protocols, etc.

The virtualization resources 708 can be instantiated to execute one or more applications or functions which are hosted by the computing system 700. For example, the virtualization resources 708 can be configured to implement various modules and functionalities of the edge computing system 114, or the edge computing device 210 and edge trust center 220, as discussed herein. In one embodiment, the virtualization resources 708 comprise virtual machines that are implemented using a hypervisor platform which executes on the computing system 700, wherein one or more virtual machines can be instantiated to execute functions of the computing system 700. As is known in the art, virtual machines are logical processing elements that may be instantiated on one or more physical processing elements (e.g., servers, computers, or other processing devices). That is, a "virtual machine" generally refers to a software implementation of a machine (i.e., a computer) that executes programs in a manner similar to that of a physical machine. Thus, different virtual machines can run different operating systems and multiple applications on the same physical computer.

A hypervisor is an example of what is more generally referred to as "virtualization infrastructure." The hypervisor runs on physical infrastructure, e.g., CPUs and/or storage devices, of the computing system 700, and emulates the CPUs, memory, hard disk, network and other hardware resources of the host system, enabling multiple virtual machines to share the resources. The hypervisor can emulate multiple virtual hardware platforms that are isolated from each other, allowing virtual machines to run, e.g., Linux and Windows Server operating systems on the same underlying physical host. An example of a commercially available hypervisor platform that may be used to implement one or more of the virtual machines in one or more embodiments of the disclosure is the VMware® vSphere™ which may have an associated virtual infrastructure management system such as the VMware® vCenter™. The underlying physical infrastructure may comprise one or more commercially available distributed processing platforms which are suitable for the target application.

In another embodiment, the virtualization resources 708 comprise containers such as Docker containers or other types of Linux containers (LXCs). As is known in the art, in a container-based application framework, each application container comprises a separate application and associated dependencies and other components to provide a complete file system, but shares the kernel functions of a host operating system with the other application containers. Each application container executes as an isolated process in user space of a host operating system. In particular, a container system utilizes an underlying operating system that provides the basic services to all containerized applications using virtual-memory support for isolation. One or more containers can be instantiated to execute one or more applications or functions of the computing system 700 as well as various modules and functionalities of the security management system 116 (FIG. 1), the edge computing device 210 (FIG. 2), and the edge trust center 220 (FIG. 2), as discussed herein. In yet another embodiment, containers may be used in combination with other virtualization infrastructure such as virtual machines implemented using a hypervisor, wherein Docker containers or other types of LXCs are configured to run on virtual machines in a multi-tenant environment.

In one embodiment, the various modules and functions of the security management system 116 (FIG. 1), the edge computing device 210 (FIG. 2), and the edge trust center 220 (FIG. 2), comprise program code that is loaded into the system memory 710 (e.g., volatile memory 712), and executed by the processors 702 to perform respective functions as described herein. In this regard, the system memory 710, the storage resources 716, and other memory or storage resources as described herein, which have program code and data tangibly embodied thereon, are examples of what is more generally referred to herein as "processor-readable storage media" that store executable program code of one or more software programs. Articles of manufacture comprising such processor-readable storage media are considered embodiments of the disclosure. An article of manufacture may comprise, for example, a storage device such as a storage disk, a storage array or an integrated circuit containing memory. The term "article of manufacture" as used herein should be understood to exclude transitory, propagating signals.

The system memory 710 comprises various types of memory such as volatile RAM, NVRAM, or other types of memory, in any combination. The volatile memory 712 may be a dynamic random-access memory (DRAM) (e.g., DRAM DIMM (Dual In-line Memory Module), or other forms of volatile RAM. The non-volatile memory 714 may comprise one or more of a NAND Flash storage device, an SSD device, or other types of next generation non-volatile memory (NGNVM) devices. The system memory 710 can be implemented using a hierarchical memory tier structure wherein the volatile system memory 712 is configured as the highest-level memory tier, and the non-volatile system memory 714 (and other additional non-volatile memory devices which comprise storage-class memory) is configured as a lower level memory tier which is utilized as a high-speed load/store non-volatile memory device on a processor memory bus (i.e., data is accessed with loads and stores, instead of with I/O reads and writes). The term "memory" or "system memory" as used herein refers to volatile and/or non-volatile memory which is utilized to store application program instructions that are read and processed by the processors 702 to execute a native operating system and one or more applications or processes hosted by the computing system 700, and to temporarily store data that is utilized and/or generated by the native OS and application programs and processes running on the computing system 700. The storage resources 716 can include one or more HDDs, SSD storage devices, etc.

It is to be understood that the above-described embodiments of the disclosure are presented for purposes of illustration only. Many variations may be made in the particular arrangements shown. For example, although described in the context of particular system and device configurations, the techniques are applicable to a wide variety of other types of information processing systems, computing systems, data storage systems, processing devices and distributed virtual infrastructure arrangements. In addition, any simplifying assumptions made above in the course of describing the illustrative embodiments should also be viewed as exemplary rather than as requirements or limitations of such embodiments. Numerous other alternative embodiments within the scope of the appended claims will be readily apparent to those skilled in the art.

What is claimed is:

1. A method, comprising:
   communicating, by a security management system, with a cloud system to determine different types of data encryption services and secured data analytic services offered by the cloud system;

mapping, by the security management system, a plurality of different data sensitivity levels to respective ones of the data encryption services and the secured data analytic services determined to be offered by the cloud system, wherein the plurality of different data sensitivity levels comprises at least (i) a first sensitivity level, (ii) a second sensitivity level which is greater than the first sensitivity level, and (iii) a non-sensitive level;

receiving, by the security management system, data from a device which operates in a device network that is managed by the security management system;

performing, by the security management system, a data classification process to determine a given data sensitivity level of the received data, wherein the given data sensitivity level comprises one of the plurality of different data sensitivity levels;

determining, by the security management system, at least one of a data encryption service and a secured data analytic service mapped to the determined data sensitivity level of the received data; and sending, by the security management system, the received data to the cloud system for at least one of (i) storing the data in an encrypted format and (ii) performing secured data analytic processing of the data, utilizing the at least one of the data encryption service and the secured data analytic service mapped to the given data sensitivity level of the received data.

2. The method of claim 1, wherein the security management system is implemented in an edge computing system of an Internet of Things (IoT) device network.

3. The method of claim 1, wherein performing the data classification process comprises utilizing, by the security management system, a set of security policies to determine the given data sensitivity level of the received data according to one or more security policies of the set of security policies.

4. The method of claim 3, wherein the set of security policies include security rules that are at least one of user-defined and automatically generated by the security management system.

5. The method of claim 1, wherein performing the data classification process comprises utilizing, by the security management system, data analytics usage information, which is derived by tracking data analytic jobs performed in the cloud system, to determine the given data sensitivity level of the received data based at least in part on the data analytics usage information.

6. The method of claim 1, wherein the plurality of different data sensitivity levels further comprises at least one additional sensitivity level, which is different from each of the first sensitivity level, the second sensitivity level and the non-sensitive level.

7. The method of claim 1, further comprising encrypting, by security management system, the received data according to a type of encryption which corresponds to the at least one of the data encryption service and the secured data analytic service mapped to the given data sensitivity level of the received data, prior to sending the received data to the cloud system.

8. An article of manufacture comprising a non-transitory processor-readable storage medium having stored therein program code of one or more software programs, wherein the program code is executable by one or more processors to implement a method comprising:

communicating, by a security management system, with a cloud system to determine different types of data encryption services and secured data analytic services offered by the cloud system;

mapping, by the security management system, a plurality of different data sensitivity levels to respective ones of the data encryption services and the secured data analytic services determined to be offered by the cloud system, wherein the plurality of different data sensitivity levels comprises at least (i) a first sensitivity level, (ii) a second sensitivity level which is greater than the first sensitivity level, and (iii) a non-sensitive level;

receiving, by the security management system, data from a device which operates in a device network that is managed by the security management system;

performing, by the security management system, a data classification process to determine a given data sensitivity level of the received data, wherein the given data sensitivity level comprises one of the plurality of different data sensitivity levels;

determining, by the security management system, at least one of a data encryption service and a secured data analytic service mapped to the determined data sensitivity level of the received data; and sending, by the security management system, the received data to the cloud system for at least one of (i) storing the data in an encrypted format and (ii) performing secured data analytic processing of the data, utilizing the at least one of the data encryption service and the secured data analytic service mapped to the given data sensitivity level of the received data.

9. The article of manufacture of claim 8, wherein the security management system is implemented in an edge computing system of an Internet of Things (IoT) device network.

10. The article of manufacture of claim 8, wherein the program code for performing the data classification process comprises program code that is executable by the one or more processors to perform a method which comprises utilizing, by the security management system, a set of security policies to determine the given data sensitivity level of the received data according to one or more security policies of the set of security policies.

11. The article of manufacture of claim 10, wherein the set of security policies include security rules that are at least one of user-defined and automatically generated by the security management system.

12. The article of manufacture of claim 8, wherein the program code for performing the data classification process comprises program code that is executable by the one or more processors to perform a method which comprises utilizing, by the security management system, data analytics usage information, which is derived by tracking data analytic jobs performed in the cloud system, to determine the given data sensitivity level of the received data based at least in part on the data analytics usage information.

13. The article of manufacture of claim 8, wherein the plurality of different data sensitivity levels further comprises at least one additional sensitivity level, which is different from each of the first sensitivity level, the second sensitivity level and the non-sensitive level.

14. The article of manufacture of claim 8, further comprising program code that is executable by the one or more processors to perform a method which comprises encrypting, by security management system, the received data according to a type of encryption which corresponds to the at least one of the data encryption service and the secured data analytic service mapped to the given data sensitivity level of the received data, prior to sending the received data to the cloud system.

15. A system, comprising:
at least one processor; and
a system memory configured to store program code, wherein the program code is executable by the at least one processor to instantiate a security management system to manage a device network, wherein the security management system is configured to:
communicate with a cloud system to determine different types of data encryption services and secured data analytic services offered by the cloud system;
map a plurality of different data sensitivity levels to respective ones of the data encryption services and the secured data analytic services determined to be offered by the cloud system, wherein the plurality of different data sensitivity levels comprises at least (i) a first sensitivity level, (ii) a second sensitivity level which is greater than the first sensitivity level, and (iii) a non-sensitive level;
receive data from a device which operates in a device network that is managed by the security management system;
perform a data classification process to determine a given data sensitivity level of the received data, wherein the given data sensitivity level comprises one of the plurality of different data sensitivity levels;
determine at least one of a data encryption service and a secured data analytic service mapped to the determined data sensitivity level of the received data; and
send the received data to the cloud system for at least one of (i) storing the data in an encrypted format and (ii) performing secured data analytic processing of the data, utilizing the at least one of the data encryption service and the secured data analytic service mapped to the given data sensitivity level of the received data.

16. The system of claim 15, wherein the security management system is implemented in an edge computing system of an Internet of Things (IoT) device network.

17. The system of claim 15, wherein in performing the data classification process, the security management system is configured to utilize a set of security policies to determine the given data sensitivity level of the received data according to one or more security policies of the set of security policies, wherein the set of security policies include security rules that are at least one of user-defined and automatically generated by the security management system.

18. The system of claim 15, wherein in performing the data classification process, the security management system is configured to utilize data analytics usage information, which is derived by tracking data analytic jobs performed in the cloud system, to determine the given data sensitivity level of the received data based at least in part on the data analytics usage information.

19. The system of claim 15, wherein the plurality of different data sensitivity levels further comprises at least one additional sensitivity level, which is different from each of the first sensitivity level, the second sensitivity level and the non-sensitive level.

20. The system of claim 15, wherein the security management system is further configured to encrypt the received data according to a type of encryption which corresponds to the at least one of the data encryption service and the secured data analytic service mapped to the given data sensitivity level of the received data, prior to sending the received data to the cloud system.

* * * * *